United States Patent
Li et al.

(10) Patent No.: US 10,708,971 B2
(45) Date of Patent: *Jul. 7, 2020

(54) MOBILITY MANAGEMENT METHOD, USER EQUIPMENT, STORAGE NODE, AND BASE STATION

(71) Applicant: Huawei Technologies Co., Ltd., Shenzhen (CN)

(72) Inventors: Bingzhao Li, Beijing (CN); Wei Quan, Beijing (CN); Jian Zhang, Beijing (CN); Weihua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,617

(22) Filed: Jun. 29, 2018

(65) Prior Publication Data

US 2018/0310358 A1   Oct. 25, 2018

Related U.S. Application Data

(63) Continuation of application No. PCT/CN2015/100338, filed on Dec. 31, 2015.

(51) Int. Cl.
*H04L 12/50* (2006.01)
*H04W 76/20* (2018.01)
(Continued)

(52) U.S. Cl.
CPC ....... *H04W 76/20* (2018.02); *H04W 52/0209* (2013.01); *H04W 76/30* (2018.02);
(Continued)

(58) Field of Classification Search
CPC ..................................................... H04L 12/50
(Continued)

(56) References Cited

U.S. PATENT DOCUMENTS

2009/0264132 A1   10/2009  Tajima et al.
2013/0208699 A1   8/2013   Häkkinen et al.
(Continued)

FOREIGN PATENT DOCUMENTS

CN   103687053 A   3/2014
CN   104144524 A   11/2014
(Continued)

OTHER PUBLICATIONS

"3rd Generation Partnership Project; Technical Specification Group Services and System Aspects; Architecture enhancements for Cellular Internet of Things (Release 13)," 3GPP TR 23/20 V1.2.0, XP051046270, pp. 1-96, 3rd Generation Partnership Project, Valbonne, France (Nov. 2015).

(Continued)

*Primary Examiner* — Dang T Ton
(74) *Attorney, Agent, or Firm* — Leydig, Voit & Mayer, Ltd.

(57) ABSTRACT

Embodiments of the present disclosure disclose a mobility management method, user equipment, a storage node, and a base station. The mobility management method may include: determining, by user equipment (UE) in a connected state, a source identifier of the UE, where the source identifier is used to identify the UE; allowing the UE to enter a low consumption state after a low consumption activation condition is met, where in the low consumption state, the UE stores a connection context of the UE in the connected state and performs cell camping based on a cell reselection criterion in a moving process; and reporting, by the UE when a first preset condition is met, the source identifier to a second base station to which a second cell belongs, where the second cell is a serving cell on which the UE currently camps.

18 Claims, 9 Drawing Sheets

(51) Int. Cl.
*H04W 76/30* (2018.01)
*H04W 52/02* (2009.01)

(52) U.S. Cl.
CPC .......... *Y02D 70/122* (2018.01); *Y02D 70/124* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/20* (2018.01); *Y02D 70/24* (2018.01); *Y02D 70/26* (2018.01)

(58) Field of Classification Search
USPC .......................................................... 370/403
See application file for complete search history.

(56) References Cited

U.S. PATENT DOCUMENTS

| | | | |
|---|---|---|---|
| 2013/0260811 A1 | 10/2013 | Rayavarapu | |
| 2016/0057797 A1* | 2/2016 | Bangolae | H04W 52/0209 370/311 |
| 2019/0182840 A1* | 6/2019 | Feng | H04W 72/06 |

FOREIGN PATENT DOCUMENTS

| | | | |
|---|---|---|---|
| CN | 105122672 A | | 12/2015 |
| EP | 2621222 A1 | | 7/2013 |
| EP | 2645804 A1 | * | 10/2013 |
| EP | 2645804 A1 | | 10/2013 |
| JP | 2011009798 A | | 1/2011 |
| JP | 2013157723 A | | 8/2013 |
| RU | 2469503 C2 | | 12/2012 |
| WO | 2012045369 A1 | | 4/2012 |
| WO | 2012131568 A2 | | 10/2012 |
| WO | 2013144613 A1 | | 10/2013 |
| WO | 2015136893 A1 | | 9/2015 |

OTHER PUBLICATIONS

"Measurements and mobility with C-eDRX," 3GPP TSG RAN WG2 #91, Beijing, China, R2-153544, 3rd Generation Partnership Project, Valbonne, France (Aug. 24-28, 2015).

"Report of the LTE breakout session (NB-IoT)," 3GPP TSG-RAN WG2 Meeting #92, Anaheim, USA, R2-157014, 3rd Generation Partnership Project, Valbonne, France (Nov. 16-20, 2015).

"Discussion on user plane solution of AS context reuse for NB-IOT," 3GPP TSG RAN WG2 Meeting #92, Anaheim, USA, R2-156350, 3rd Generation Partnership Project, Valbonne, France (Nov. 16-20, 2015).

"RRC aspects in NB-IoT," 3GPP TSG-RAN2 Meeting #92, Anaheim, USA, R2-156425, 3rd Generation Partnership Project, Valbonne, France (Nov. 16-20, 2015).

JP 2018-534603, Office Action, dated May 20, 2019.

"3rd Generation Partnership Project;Technical Specification Group Radio Access Network; Evolved Universal Terrestrial Radio Access Network (E-UTRAN); X2 application protocol (X2AP) (Release 13)," 3GPP TS 36.423 V13.2.0, pp. 1-230, 3rd Generation Partnership Project, Valbonne, France (Dec. 2015).

"3rd Generation Partnership Project; Technical Specification Group Radio Access Network; Evolved Universal Terrestrial Radio Access (E-UTRA) and Evolved Universal Terrestrial Radio Access Network (E-Utran); Overall lescription; Stage 2 (Release 13)," 3GPP TS 36.300 V13.1.0, pp. 1-254, 3rd Generation Partnership Project, Valbonne, France (Sep. 2015).

* cited by examiner

MOBILITY MANAGEMENT METHOD, USER EQUIPMENT, STORAGE NODE, AND BASE STATION

CROSS-REFERENCE TO RELATED APPLICATIONS

This application is a continuation of International Application No. PCT/CN2015/100338, filed on Dec. 31, 2015, the disclosure of which is hereby incorporated by reference in its entirety.

TECHNICAL FIELD

Embodiments of the present disclosure relate to the field of communications, and more specifically, to a mobility management method, user equipment, a storage node, and a base station.

BACKGROUND

Mobility management is an important task in a wireless mobile communications system. Usually, the mobility management may include mobile network switching, cell reselection, and the like for user equipment (UE).

In a Long Term Evolution (LTE)/LTE-advanced (LTE-A) system of the 3rd Generation Partnership Project (3GPP), the UE may be in an idle state or a connected state. The UE in the idle state is not connected to a base station, cannot send data, and performs cell reselection in a moving process. If the UE in this state needs to send data, the UE needs to switch to the connected state first. The UE in the idle state may enter the connected state after obtaining a connection context and a dedicated identifier of the UE in a cell in a radio resource control (RRC) connection establishment process. The UE in the connected state is connected to the base station, and can send data, and handover is performed when the UE moves. The UE in the connected state may enter the idle state after an RRC connection release process.

A typical procedure of the handover of the UE in the connected state may include the following steps: A source base station, that is, a current serving base station of the UE, configures a measurement parameter for the UE; the UE performs measurement and reports a measurement result to the source base station; the source base station sends a handover request to a target base station, and sends a handover command to the UE after confirmation by the target base station; and the UE accesses the target base station, obtains uplink synchronization, sends a handover completion message, and the like.

In future network evolution, there are more and more network deployment forms, such as a heterogeneous network (Hetnet), coordinated multiple points (CoMP) transmission, small cell networking, small cell dense networking, and the like. These network deployment forms pose a new challenge to UE mobility management. If the existing handover procedure is still used, the UE needs to continuously perform measurement and reporting. This requires a large amount of handover signaling overhead, and wastes radio resources.

SUMMARY

Embodiments of the present disclosure provide a mobility management method, user equipment, a storage node, and a base station, to avoid handover signaling overheads and radio resource waste that are caused because a UE in a connected state that does not need to transmit data is frequently handed over in a moving process.

According to a first aspect, an embodiment of the present disclosure provides a mobility management method, where the method may include:

determining, by a first base station to which a first cell belongs, a source identifier of a user equipment (UE) in a connected state in the first cell, where the source identifier is used to identify the UE; and after determining that the UE enters a low consumption state, storing a connection context of the UE in the connected state, or sending the connection context to a context storage node, where the UE enters the low consumption state when a preset activation condition is met, and in the low consumption state, the UE stores the connection context and performs cell camping based on a cell reselection criterion in a moving process.

With reference to the first aspect, in a first possible implementation of the first aspect, the determining, by a first base station to which a first cell belongs, a source identifier of a user equipment (UE) in a connected state in the first cell includes:

receiving, by the first base station, the source identifier of the UE that is sent by the context storage node; or receiving, by the first base station, the source identifier of the UE that is sent by the UE; or receiving, by the first base station, the source identifier of the UE that is sent by a core network device.

With reference to the first aspect or the first possible implementation of the first aspect, in a second possible implementation of the first aspect, the source identifier includes at least one of an international mobile subscriber identity (IMSI), a temporary identity (T-MISI), and a radio network temporary identifier (RNTI) of the UE.

With reference to the first aspect, the first possible implementation of the first aspect, or the second possible implementation of the first aspect, in a third possible implementation of the first aspect, after the sending the connection context to a context storage node, the method further includes: releasing, by the first base station, the connection context.

With reference to the first aspect, the first possible implementation of the first aspect, the second possible implementation of the first aspect, or the third possible implementation of the first aspect, in a fourth possible implementation of the first aspect, the preset activation condition includes at least one or a combination of the following conditions:

the first base station sends the UE a control instruction used to instruct the UE to enter the low consumption state;

no data transmission is performed between the first base station and the UE in first preset duration;

the first base station determines that a timing advance timer (TA timer) of the UE expires, or the first base station determines that the TA timer of the UE expires and the TA timer does not rerun in second preset duration; and the first base station determines that the UE does not exit, after entering a discontinuous reception (DRX) state, the DRX state being in a third preset duration.

With reference to the first aspect, the first possible implementation of the first aspect, the second possible implementation of the first aspect, the third possible implementation of the first aspect, or the fourth possible implementation of the first aspect, in a fifth possible implementation of the first aspect, after the determining that the UE enters a low consumption state, the method further includes:

sending, by the first base station, radio resource control (RRC) configuration information to the UE for use by the UE in the low consumption state, where the RRC configuration information includes an RRC configuration index, and the configuration index is used to indicate the RRC configuration information.

According to a second aspect, an embodiment of the present disclosure provides a mobility management method, where the method may include:

receiving a connection context of a user equipment (UE) in a connected state that is sent by a first base station;

determining that the UE is in a low consumption state, and storing the connection context, where in the low consumption state, the UE stores the connection context and performs cell camping based on a cell reselection criterion in a moving process; and sending a path switching request to a core network device, so that the core network device switches a core network interface related to the UE to a context storage node.

With reference to the second aspect, in a first possible implementation of the second aspect, before the receiving a connection context of a user equipment (UE) in a connected state that is sent by a first base station, the method includes:

allocating a source identifier of the UE, and sending the source identifier to the first base station.

With reference to the second aspect or the first possible implementation of the second aspect, in a second possible implementation of the second aspect, after the determining that the UE is in a low consumption state, the method further includes:

receiving a connection context transfer request sent by a second base station, where the connection context is the connection context of the UE in the connected state that is stored by the context storage node when the UE enters the low consumption state, the context transfer request carries the source identifier, and the second base station is a current serving base station of the UE; and sending the connection context to the second base station based on the source identifier carried in the transfer request.

With reference to the second aspect, the first possible implementation of the second aspect, or the second possible implementation of the second aspect, in a third possible implementation of the second aspect, after the determining that the UE is in a low consumption state, the method further includes:

receiving and storing a notification message sent by the second base station, where the notification message carries the source identifier of the UE and a cell identifier of a serving cell in which the UE is currently located, so that the first base station determines the current serving cell of the UE based on the notification message.

With reference to the third possible implementation of the second aspect, in a fourth possible implementation of the second aspect, the notification message carries verification information of the UE, and the verification information is identity verification information generated by the UE based on the source identifier and a key that is stored in the connection context; and after the receiving and storing a notification message sent by the second base station, the method further includes:

determining, by the context storage node, whether the UE is a valid UE based on the source identifier and the verification information.

With reference to the second aspect, the first possible implementation of the second aspect, the second possible implementation of the second aspect, the third possible implementation of the second aspect, or the fourth possible implementation of the second aspect, in a fifth possible implementation of the second aspect, after the determining that the UE is in a low consumption state, the method further includes:

sending, by the context storage node, the connection context and the source identifier to the second base station when downlink data of the UE arrives at the context storage node, where the connection context is the connection context of the UE in the connected state that is stored by the context storage node when the UE enters the low consumption state, and the second base station is the current serving base station of the UE.

According to a third aspect, an embodiment of the present disclosure provides a mobility management method, where the method may include:

determining, by a user equipment (UE) in a connected state in a first cell, a source identifier of the UE, where the source identifier is used to identify the UE;

allowing the UE to enter a low consumption state when a preset activation condition is met, where in the low consumption state, the UE stores a connection context of the UE in the connected state and performs cell camping based on a cell reselection criterion in a moving process; and reporting, by the UE when a first preset condition is met, the source identifier to a second base station to which a second cell belongs, where the second cell is a serving cell on which the UE currently camps.

With reference to the third aspect, in a first possible implementation of the third aspect, the determining, by a user equipment (UE) in a connected state in a first cell, a source identifier of the UE includes:

determining at least one of an international mobile subscriber identity (IMSI), a temporary identity (T-MISI), and a radio network temporary identifier (RNTI) of the UE as the source identifier; or receiving the source identifier sent by a first base station, where the first base station is a base station to which the first cell belongs.

With reference to the third aspect or the first possible implementation of the third aspect, in a second possible implementation of the third aspect, the base station to which the first cell belongs is the first base station; and the preset activation condition includes at least one of the following conditions:

the UE receives a control instruction that is sent by the first base station and that instructs to enter the low consumption state;

the UE leaves the first cell;

no data transmission is performed between the UE and the first base station in a first preset duration;

a timing advance timer (TA timer) of the UE expires, or the TA timer of the UE expires and the TA timer does not rerun in a second preset duration; and after entering a discontinuous reception (DRX) state, the UE does not exit the DRX state in a third preset duration.

With reference to the third aspect, the first possible implementation of the third aspect, or the second possible implementation of the third aspect, in a third possible implementation of the third aspect, after the allowing the UE to enter a low consumption state when a preset activation condition is met, the method further includes:

exiting, by the UE, the low consumption state when a second preset condition is met; and the second preset condition includes:

the serving cell on which the UE currently camps changes; or the serving cell on which the UE currently camps goes beyond a specified cell set range; or the serving cell on which the UE currently camps and the first cell do not belong to a same preset area or a same base station; or the UE sends the source identifier to the second base station, and receives an access rejection indication sent by the second base station for the source identifier; or the UE reads a system information broadcast of the second cell, and the system information broadcast carries no indication for allowing the UE in the low consumption state to get access; or the UE needs to send uplink data.

With reference to the third possible implementation of the third aspect, in a fourth possible implementation of the third aspect, the exiting, by the UE, the low consumption state when a second preset condition is met includes: when the second preset condition is met, clearing, by the UE, the connection context, and entering an idle state.

With reference to the third aspect, the first possible implementation of the third aspect, the second possible implementation of the third aspect, the third possible implementation of the third aspect, or the fourth possible implementation of the third aspect, in a fifth possible implementation of the third aspect, the first preset condition includes:

the serving cell on which the UE currently camps changes; or the second cell on which the UE currently camps goes beyond a specified cell set range; or the second cell on which the UE currently camps and the first cell do not belong to a same preset area or a same base station; or the UE needs to send uplink data.

With reference to the third aspect, the first possible implementation of the third aspect, the second possible implementation of the third aspect, the third possible implementation of the third aspect, the fourth possible implementation of the third aspect, or the fifth possible implementation of the third aspect, in a sixth possible implementation of the third aspect, before the reporting, by the UE when a first preset condition is met, the source identifier to a second base station to which a second cell belongs, the method includes:

receiving and reading, by the UE, a system information broadcast of the second cell; and if the system information broadcast carries an indication for allowing the UE in the low consumption state to get access, determining, by the UE based on the access indication, to send the source identifier to the second base station.

With reference to the third aspect, the first possible implementation of the third aspect, the second possible implementation of the third aspect, the third possible implementation of the third aspect, the fourth possible implementation of the third aspect, the fifth possible implementation of the third aspect, or the sixth possible implementation of the third aspect, in a seventh possible implementation of the third aspect, before the reporting, by the UE when a first preset condition is met, the source identifier to a second base station to which a second cell belongs, the method further includes:

sending, by the UE, a random access preamble in a preset range to the second base station, where the random access preamble in the preset range is used to indicate that the source identifier needs to be sent to the second base station or a message of a length greater than a preset length threshold needs to be sent to the second base station;

receiving a transmission resource of a preset size that is allocated by the second base station and that is used to transmit the source identifier; and using the transmission resource to send the source identifier to the second base station.

With reference to the seventh possible implementation of the third aspect, in an eighth possible implementation of the third aspect, the random access preamble in the preset range is a predefined preamble or a received preamble configured by the second base station.

With reference to the seventh possible implementation of the third aspect or the eighth possible implementation of the third aspect, in a ninth possible implementation of the third aspect, the using the transmission resource to send the source identifier to the second base station includes:

receiving an encrypted response message sent by the second base station, and performing decryption based on a key stored in the connection context; and establishing, by the UE, a connection to the second base station based on the response message after the decryption succeeds.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, or the ninth possible implementation of the third aspect, in a tenth possible implementation of the third aspect, the reporting, by the UE, the source identifier to a second base station to which a second cell belongs includes:

sending, by the UE, a random access preamble to the second base station;

receiving a dedicated UE identifier that is sent by the second base station and a transmission resource that is allocated by the second base station based on the random access preamble and that is used to transmit the source identifier, where the dedicated UE identifier is an identifier used to uniquely identify the UE in the second cell;

using the transmission resource to send the source identifier to the second base station;

receiving confirmation information that is sent by the second base station and that includes the source identifier; and determining, based on the confirmation information, whether to use the dedicated UE identifier.

With reference to the tenth possible implementation of the third aspect, in an eleventh possible implementation of the third aspect, the determining, based on the confirmation information, whether to use the dedicated UE identifier includes:

determining, by the UE based on the confirmation information, not to use the dedicated UE identifier; or using, by the UE, the dedicated UE identifier based on the confirmation information, and exiting the low consumption state; or using, by the UE, the dedicated UE identifier based on the confirmation information, and remaining in the low consumption state; or using, by the UE, the dedicated UE identifier, and exiting the low consumption state based on an instruction that is carried in the confirmation information and that instructs the UE to exit the low consumption state.

With reference to the eleventh possible implementation of the third aspect, in a twelfth possible implementation of the third aspect, after the using, by the UE, the dedicated UE identifier, the method includes:

updating a key in the connection context based on a cell identifier of the serving cell on which the UE currently camps.

With reference to the twelfth possible implementation of the third aspect, in a thirteenth possible implementation of the third aspect, the source identifier further includes verification information, and the verification information is identity verification information generated by the UE based on the source identifier and the updated key.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, the eleventh possible implementation of the third aspect, the twelfth possible implementation of the third aspect, or the thirteenth possible implementation of the third aspect, in a fourteenth possible implementation of the third aspect, after the allowing the UE to enter a low consumption state when a preset activation condition is met, the method further includes:

monitoring, by the UE, paging based on the source identifier.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, the eleventh possible implementation of the third aspect, the twelfth possible implementation of the third aspect, the thirteenth possible implementation of the third aspect, or the fourteenth possible implementation of the third aspect, in a fifteenth possible implementation of the third aspect, after the allowing the UE to enter a low consumption state when a preset activation condition is met, the method further includes:

receiving radio resource control (RRC) configuration information sent by the first base station, where the RRC configuration information includes an RRC configuration index, and the configuration index is used to indicate the RRC configuration information; and using, by the UE in the low consumption state, the RRC configuration information.

With reference to the fifteenth possible implementation of the third aspect, in a sixteenth possible implementation of the third aspect, the reporting, by the UE when a first preset condition is met, the source identifier to a second base station to which a second cell belongs includes:

reporting, by the UE, the source identifier including the RRC configuration index to the second base station to which the second cell belongs, so that the second base station determines, based on the RRC configuration index, the RRC configuration information used by the UE.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, the seventh possible implementation of the third aspect, the eighth possible implementation of the third aspect, the ninth possible implementation of the third aspect, the tenth possible implementation of the third aspect, the eleventh possible implementation of the third aspect, the twelfth possible implementation of the third aspect, the thirteenth possible implementation of the third aspect, the fourteenth possible implementation of the third aspect, the fifteenth possible implementation of the third aspect, or the sixteenth possible implementation of the third aspect, in a seventeenth possible implementation of the third aspect, the first preset condition is that the UE needs to send uplink data, and the reporting, by the UE, the source identifier to a second base station to which a second cell belongs further includes:

reporting, by the UE when or after reporting the source identifier, an uplink data indication to the second base station to which the second cell belongs.

According to a fourth aspect, an embodiment of the present disclosure provides a mobility management method, where the method may include:

receiving, by a second base station to which a second cell belongs, a source identifier reported by a user equipment (UE) in a low consumption state, where in the low consumption state, the UE stores a connection context of the UE in a connected state and performs cell camping based on a cell reselection criterion in a moving process, the first cell is a serving cell of the UE when the UE enters the low consumption state, the second cell is a current serving cell of the UE, and the source identifier includes a first UE identifier used to identify the UE in a first base station to which the first cell belongs; and sending the first UE identifier to a context storage node based on the source identifier, to notify the context storage node that it is learned that the current serving cell of the UE is the second cell.

With reference to the fourth aspect, in a first possible implementation of the fourth aspect, the source identifier includes at least one of an international mobile subscriber identity (IMSI), a temporary identity (T-MISI), and a radio network temporary identifier (RNTI) of the UE.

With reference to the fourth aspect or the first possible implementation of the fourth aspect, in a second possible implementation of the fourth aspect, the source identifier further includes indication information, and the indication information is used to notify the second base station that the UE is in the low consumption state.

With reference to the fourth aspect, the first possible implementation of the fourth aspect, or the second possible implementation of the fourth aspect, in a third possible implementation of the fourth aspect, before the receiving, by a second base station to which a second cell belongs, a source identifier reported by a user equipment (UE) in a low consumption state, the method includes:

sending, by the second base station, a system information broadcast, where the system information broadcast carries an indication for allowing the UE in the low consumption state to get access, so that the UE determines, based on the access indication, whether to send the source identifier to the second base station.

With reference to the fourth aspect, the first possible implementation of the fourth aspect, the second possible implementation of the fourth aspect, or the third possible implementation of the fourth aspect, in a fourth possible implementation of the fourth aspect, before the receiving, by a second base station to which a second cell belongs, a source identifier reported by a user equipment (UE) in a low consumption state, the method further includes:

receiving a random access preamble sent by the UE; and allocating a transmission resource of a preset size to the UE when the random access preamble falls within a preset range, so that the UE uses the transmission resource to send the source identifier.

With reference to the fourth possible implementation of the fourth aspect, in a fifth possible implementation of the fourth aspect, the random access preamble in the preset range is a predefined preamble or a received preamble configured by the second base station.

With reference to the fourth aspect, the first possible implementation of the fourth aspect, the second possible implementation of the fourth aspect, the third possible implementation of the fourth aspect, the fourth possible implementation of the fourth aspect, or the fifth possible implementation of the fourth aspect, in a sixth possible implementation of the fourth aspect, the receiving, by a second base station to which a second cell belongs, a source identifier reported by a user equipment (UE) in a low consumption state includes:

receiving, by the second base station to which the second cell belongs, a random access preamble sent by the user equipment (UE) in the low consumption state;

allocating, to the UE based on the random access preamble, a dedicated UE identifier and a transmission resource that is used to transmit the source identifier, where the dedicated UE identifier is an identifier used to uniquely identify the UE in the second cell;

using the transmission resource to receive the source identifier; and sending confirmation information including the source identifier to the UE.

With reference to the sixth possible implementation of the fourth aspect, in a seventh possible implementation of the fourth aspect, after the receiving, by the second base station to which the second cell belongs, a random access preamble sent by the user equipment (UE) in the low consumption state, the method further includes:

generating, by the second base station, a response message corresponding to the reported source identifier, where the response message is encrypted based on a key stored in the connection context; and sending the encrypted response message to the UE.

With reference to the sixth possible implementation of the fourth aspect or the seventh possible implementation of the fourth aspect, in an eighth possible implementation of the fourth aspect, the sending confirmation information including the source identifier to the UE includes:

sending a confirmation message that includes the source identifier and that carries an instruction instructing the UE to exit the low consumption state to the UE, so that the UE uses the dedicated UE identifier and exits the low consumption state based on the instruction.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, or the eighth possible implementation of the fourth aspect, in a ninth possible implementation of the fourth aspect, the sending the first UE identifier to a context storage node based on the source identifier includes:

sending a notification message to the context storage node based on the source identifier, where the notification message carries the source identifier of the UE and a second cell identifier of the second cell in which the UE is currently located, so that the context storage node determines, based on the source identifier and the second cell identifier, that a serving cell on which the UE currently camps is the second cell.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, or the ninth possible implementation of the fourth aspect, in a tenth possible implementation of the fourth aspect, after the sending the first UE identifier to a context storage node based on the source identifier, the method further includes:

receiving the source identifier and an uplink data indication that are sent by the UE;

sending, by the second base station, a connection context transfer request to the context storage node, where the connection context is the connection context of the UE in the connected state that is stored by the context storage node when the UE enters the low consumption state, and the context transfer request carries the source identifier of the UE; and receiving the connection context transferred by the context storage node, and establishing a connection to the UE based on the connection context.

With reference to the tenth possible implementation of the fourth aspect, in an eleventh possible implementation of the fourth aspect, after the receiving the connection context transferred by the context storage node, the method further includes:

sending a reallocated source identifier to the UE, where the reallocated source identifier includes a second UE identifier used to identify the UE in the second base station; and sending an instruction to the UE to instruct the UE to exit the low consumption state.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, the ninth possible implementation of the fourth aspect, the tenth possible implementation of the fourth aspect, or the eleventh possible implementation of the fourth aspect, in a twelfth possible implementation of the fourth aspect, after the sending the first UE identifier to a context storage node based on the source identifier, the method further includes:

receiving the connection context and the source identifier of the UE that are sent by the context storage node; and determining configuration information of the UE based on the received connection context and source identifier, and triggering, based on the source identifier, the UE to perform uplink access.

With reference to the twelfth possible implementation of the fourth aspect, in a thirteenth possible implementation of the fourth aspect, the triggering, based on the source identifier, the UE to perform uplink access includes:

paging the UE based on the source identifier; or determining the dedicated UE identifier of the UE based on the source identifier, and sending an uplink access command to the UE based on the dedicated UE identifier; or determining the dedicated UE identifier of the UE based on the source identifier, and paging the UE based on the dedicated UE identifier.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, the ninth possible implementation of the fourth aspect, the tenth possible implementation of the fourth aspect, the eleventh possible implementation of the fourth aspect, the twelfth possible implementation of the fourth aspect, or the thirteenth possible implementation of the fourth aspect, in a fourteenth possible implementation of the fourth aspect, the source identifier further includes a radio resource control (RRC) configuration index, and after the receiving, by a second base station to which a second cell belongs, a source identifier reported by user equipment (UE) in a low consumption state, the method further includes:

determining, by the second base station based on the RRC configuration index, RRC configuration information used by the UE.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, the seventh possible implementation of the fourth aspect, the eighth possible implementation of the fourth aspect, the ninth possible implementation of the fourth aspect, the tenth possible implementation of the fourth aspect, the eleventh possible implementation of the fourth aspect, the twelfth possible implementation of the fourth aspect, the thirteenth possible implementation of the fourth aspect, or the fourteenth possible implementation of the fourth aspect, in a fifteenth possible implementation of the fourth aspect, the sending the first UE identifier to a context storage node based on the source identifier includes:

sending the source identifier to the context storage node through an interface between the second base station and the context storage node based on the source identifier; or sending the source identifier to the context storage node by using a core network based on the source identifier.

According to a fifth aspect, an embodiment of the present disclosure provides a base station, where the base station is a first base station, and the first base station may include: an output unit, a storage unit, and a processing unit;

the storage unit is configured to store program code, and the processing unit is configured to invoke the program code stored by the storage unit to perform the following steps:

determining, by the first base station to which a first cell belongs, a source identifier of a user equipment (UE) in a connected state in the first cell, where the source identifier is used to identify the UE; and after determining that the UE enters a low consumption state, storing a connection context of the UE in the connected state, or sending the connection context to a context storage node, where the UE enters the low consumption state when a preset activation condition is met, and in the low consumption state, the UE stores the connection context and performs cell camping based on a cell reselection criterion in a moving process.

With reference to the fifth aspect, in a first possible implementation of the fifth aspect, the first base station further includes an input unit, and that the processing unit is configured to determine a source identifier of a user equipment (UE) in a connected state in the first cell is specifically:

receiving, by using the input unit, the source identifier of the UE that is sent by the context storage node; or receiving, by using the input unit, the source identifier of the UE that is sent by the UE; or receiving, by using the input unit, the source identifier of the UE that is sent by a core network device.

With reference to the fifth aspect or the first possible implementation of the fifth aspect, in a second possible implementation of the fifth aspect, the source identifier includes at least one of an international mobile subscriber identity (IMSI), a temporary identity (T-MISI), and a radio network temporary identifier (RNTI) of the UE.

With reference to the fifth aspect, the first possible implementation of the fifth aspect, or the second possible implementation of the fifth aspect, in a third possible implementation of the fifth aspect, the processing unit is further configured to release the connection context after sending the connection context to the context storage node.

With reference to the fifth aspect, the first possible implementation of the fifth aspect, the second possible implementation of the fifth aspect, or the third possible implementation of the fifth aspect, in a fourth possible implementation of the fifth aspect, the preset activation condition includes at least one or a combination of the following conditions:

the first base station sends the UE a control instruction used to instruct the UE to enter the low consumption state;

no data transmission is performed between the first base station and the UE in a first preset duration;

the first base station determines that a timing advance timer (TA timer) of the UE expires, or the first base station determines that the TA timer of the UE expires and the TA timer does not rerun in a second preset duration; and the first base station determines that the UE does not exit, after entering a discontinuous reception (DRX) state, the DRX state being in a third preset duration.

With reference to the fifth aspect, the first possible implementation of the fifth aspect, the second possible implementation of the fifth aspect, the third possible implementation of the fifth aspect, or the fourth possible implementation of the fifth aspect, in a fifth possible implementation of the fifth aspect, the processing unit is further configured to: after determining that the UE enters the low consumption state, send radio resource control (RRC) configuration information to the UE for use by the UE in the low consumption state, where the RRC configuration information includes an RRC configuration index, and the configuration index is used to indicate the RRC configuration information.

According to a sixth aspect, an embodiment of the present disclosure provides a context storage node, where the context storage node may include: an output unit, a storage unit, and a processing unit;

the storage unit is configured to store program code, and the processing unit is configured to invoke the program code stored by the storage unit to perform the following steps:

receiving, by using the input unit, a connection context of a user equipment (UE) in a connected state that is sent by a first base station;

determining that the UE is in a low consumption state, and storing the connection context, where in the low consumption state, the UE stores the connection context and performs cell camping based on a cell reselection criterion in a moving process; and sending a path switching request to a core network device by using the output unit, so that the core network device switches a core network interface related to the UE to the context storage node.

With reference to the sixth aspect, in a first possible implementation of the sixth aspect, the processing unit is further configured to: before receiving, by using the input unit, the connection context of the user equipment (UE) in the connected state that is sent by the first base station, allocate a source identifier of the UE, and send the source identifier to the first base station by using the output unit.

With reference to the sixth aspect or the first possible implementation of the sixth aspect, in a second possible implementation of the sixth aspect, the processing unit is further configured to: after determining that the UE is in the low consumption state, receive, by using the input unit, a connection context transfer request sent by a second base station, where the connection context is the connection context of the UE in the connected state that is stored by the context storage node when the UE enters the low consumption state, the context transfer request carries the source identifier, and the second base station is a current serving base station of the UE; and send the connection context to the second base station by using the output unit based on the source identifier carried in the transfer request.

With reference to the sixth aspect, the first possible implementation of the sixth aspect, or the second possible implementation of the sixth aspect, in a third possible implementation of the sixth aspect, the processing unit is further configured to: after determining that the UE is in the low consumption state, receive, by using the input unit, and store a notification message sent by the second base station, where the notification message carries the source identifier of the UE and a cell identifier of a serving cell in which the UE is currently located, so that the first base station determines the current serving cell of the UE based on the notification message.

With reference to the third possible implementation of the six aspect, in a fourth possible implementation of the six aspect, the notification message carries verification information of the UE, and the verification information is identity verification information generated by the UE based on the source identifier and a key that is stored in the connection context; and the processing unit is further configured to determine whether the UE is a valid UE based on the source identifier and the verification information after receiving, by using the input unit, and storing the notification message sent by the second base station.

With reference to the sixth aspect, the first possible implementation of the sixth aspect, the second possible implementation of the sixth aspect, the third possible implementation of the sixth aspect, or the fourth possible implementation of the sixth aspect, in a fifth possible implementation of the sixth aspect, the processing unit is further configured to: after determining that the UE is in the low consumption state, send the connection context and the source identifier to the second base station by using the output unit when downlink data of the UE arrives at the context storage node, where the connection context is the connection context of the UE in the connected state that is stored by the context storage node when the UE enters the low consumption state, and the second base station is the current serving base station of the UE.

According to a seventh aspect, an embodiment of the present disclosure provides user equipment UE, where the UE may include: an output unit, a storage unit, and a processing unit;

the storage unit is configured to store program code, and the processing unit is configured to invoke the program code stored by the storage unit to perform the following steps:

determining a source identifier of the UE in a connected state in a first cell, where the source identifier is used to identify the UE;

allowing the UE to enter a low consumption state when a preset activation condition is met, where in the low consumption state, the UE stores a connection context of the UE in the connected state and performs cell camping based on a cell reselection criterion in a moving process; and reporting, by using the output unit when a first preset condition is met, the source identifier to a second base station to which a second cell belongs, where the second cell is a serving cell on which the UE currently camps.

With reference to the seventh aspect, in a first possible implementation of the seventh aspect, the UE further includes an input unit, and that the processing unit is configured to determine a source identifier of the UE in a connected state in a first cell is specifically:

determining at least one of an international mobile subscriber identity (IMSI), a temporary identity (T-MISI), and a radio network temporary identifier (RNTI) of the UE as the source identifier; or receiving, by using the input unit, the source identifier sent by a first base station, where the first base station is a base station to which the first cell belongs.

With reference to the seventh aspect or the first possible implementation of the seventh aspect, in a second possible implementation of the seventh aspect, the base station to which the first cell belongs is the first base station; and the preset activation condition includes at least one of the following conditions:

the UE receives a control instruction that is sent by the first base station and that instructs to enter the low consumption state;

the UE leaves the first cell;

no data transmission is performed between the UE and the first base station in a first preset duration;

a timing advance timer (TA timer) of the UE expires, or the TA timer of the UE expires and the TA timer does not rerun in a second preset duration; and after entering a discontinuous reception (DRX) state, the UE does not exit the DRX state in a third preset duration.

With reference to the seventh aspect, the first possible implementation of the seventh aspect, or the second possible implementation of the seventh aspect, in a third possible implementation of the seventh aspect, the processing unit is further configured to: after the UE enters the low consumption state when the preset activation condition is met, allow the UE to exit the low consumption state when a second preset condition is met; and the second preset condition includes:

the serving cell on which the UE currently camps changes; or the serving cell on which the UE currently camps goes beyond a specified cell set range; or the serving cell on which the UE currently camps and the first cell do not belong to a same preset area or a same base station; or the UE sends the source identifier to the second base station, and receives an access rejection indication sent by the second base station for the source identifier; or the UE reads a system information broadcast of the second cell, and the system information broadcast carries no indication for allowing the UE in the low consumption state to get access; or the UE needs to send uplink data.

With reference to the third possible implementation of the seventh aspect, in a fourth possible implementation of the seventh aspect, that the processing unit is configured to allow the UE to exit the low consumption state when a second preset condition is met is specifically: allowing the UE to clear the connection context and enter an idle state when the second preset condition is met.

With reference to the seventh aspect, the first possible implementation of the seventh aspect, the second possible implementation of the seventh aspect, the third possible implementation of the seventh aspect, or the fourth possible implementation of the seventh aspect, in a fifth possible implementation of the seventh aspect, the first preset condition includes:

the serving cell on which the UE currently camps changes; or the second cell on which the UE currently camps goes beyond a specified cell set range; or the second cell on which the UE currently camps and the first cell do not belong to a same preset area or a same base station; or the UE needs to send uplink data.

With reference to the seventh aspect, the first possible implementation of the seventh aspect, the second possible implementation of the seventh aspect, the third possible implementation of the seventh aspect, the fourth possible implementation of the seventh aspect, or the fifth possible implementation of the seventh aspect, in a sixth possible implementation of the seventh aspect, the UE further includes the input unit, and the processing unit is further configured to: before reporting, by using the output unit when the first preset condition is met, the source identifier to the second base station to which the second cell belongs, receive, by using the input unit, and read a system information broadcast of the second cell; and if the system information broadcast carries an indication for allowing the UE in the low consumption state to get access, determine, based on the access indication, to send the source identifier to the second base station by using the output unit.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, or the sixth possible implementation of the seventh aspect, in a seventh possible implementation of the seventh aspect, the UE further includes the input unit, and the processing unit is further configured to: before reporting, by using the output unit when the first preset condition is met, the source identifier to the second base station to which the second cell belongs, send a random access preamble in a preset range to the second base station by using the output unit, where the random access preamble in the preset range is used to indicate that the source identifier needs to be sent to the second base station or a message of a length greater than a preset length threshold needs to be sent to the second base station;

receive, by using the input unit, a transmission resource of a preset size that is allocated by the second base station and that is used to transmit the source identifier; and use the transmission resource to send the source identifier to the second base station by using the output unit.

With reference to the seventh possible implementation of the seventh aspect, in an eighth possible implementation of the seventh aspect, the random access preamble in the preset range is a predefined preamble or a received preamble configured by the second base station.

With reference to the seventh possible implementation of the seventh aspect or the eighth possible implementation of the seventh aspect, in a ninth possible implementation of the seventh aspect, the UE further includes the input unit, and that the processing unit is configured to use the transmission resource to send the source identifier to the second base station by using the output unit includes:

receiving, by using the input unit, an encrypted response message sent by the second base station, and performing decryption based on a key stored in the connection context; and establishing, by the UE, a connection to the second base station based on the response message after the decryption succeeds.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, the seventh possible implementation of the seventh aspect, the eighth possible implementation of the seventh aspect, or the ninth possible implementation of the seventh aspect, in a tenth possible implementation of the seventh aspect, the UE further includes the input unit, and that the processing unit is configured to report the source identifier to a second base station to which a second cell belongs is specifically:

sending a random access preamble to the second base station by using the output unit;

receiving, by using the input unit, a dedicated UE identifier that is sent by the second base station and a transmission resource that is allocated by the second base station based on the random access preamble and that is used to transmit the source identifier, where the dedicated UE identifier is an identifier used to uniquely identify the UE in the second cell;

using the transmission resource to send the source identifier to the second base station by using the output unit;

receiving, by using the input unit, confirmation information that is sent by the second base station and that includes the source identifier; and determining, based on the confirmation information, whether to use the dedicated UE identifier.

With reference to the tenth possible implementation of the seventh aspect, in an eleventh possible implementation of the seventh aspect, that the processing unit is configured to determine, based on the confirmation information, whether to use the dedicated UE identifier is specifically:

determining, based on the confirmation information, not to use the dedicated UE identifier; or using the dedicated UE identifier based on the confirmation information, and exiting the low consumption state; or using the dedicated UE identifier based on the confirmation information, and remaining in the low consumption state; or using the dedicated UE identifier, and exiting the low consumption state based on an instruction that is carried in the confirmation information and that instructs the UE to exit the low consumption state.

With reference to the eleventh possible implementation of the seventh aspect, in a twelfth possible implementation of the seventh aspect, the processing unit is further configured to: after using the dedicated UE identifier, update a key in the connection context based on a cell identifier of the serving cell on which the UE currently camps.

With reference to the twelfth possible implementation of the seventh aspect, in a thirteenth possible implementation of the seventh aspect, the source identifier further includes verification information, and the verification information is identity verification information generated by the UE based on the source identifier and the updated key.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, the seventh possible implementation of the seventh aspect, the eighth possible implementation of the seventh aspect, the ninth possible implementation of the seventh aspect, the tenth possible implementation of the seventh aspect, the eleventh possible implementation of the seventh aspect, the twelfth possible implementation of the seventh aspect, or the thirteenth possible implementation of the seventh aspect, in a fourteenth possible implementation of the seventh aspect, the processing unit is further configured to monitor paging based on the source identifier after the UE enters the low consumption state when the preset activation condition is met.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, the seventh possible implementation of the seventh aspect, the eighth possible implementation of the seventh aspect, the ninth possible implementation of the seventh aspect, the tenth possible implementation of the seventh aspect, the eleventh possible implementation of the seventh aspect, the twelfth possible implementation of the seventh aspect, the thirteenth possible implementation of the seventh aspect, or the fourteenth possible implementation of the seventh aspect, in a fifteenth possible implementation of the seventh aspect, the UE further includes the input unit, and the processing unit is further configured to: after the UE enters the low consumption state when the preset activation condition is met, receive, by using the input unit, radio resource control (RRC) configuration information sent by the first base station, where the RRC configuration information includes an RRC configuration index, and the configuration index is used to indicate the RRC configuration information; and allow the UE in the low consumption state to use the RRC configuration information.

With reference to the fifteenth possible implementation of the seventh aspect, in a sixteenth possible implementation of the seventh aspect, that the processing unit is configured to report, by using the output unit when a first preset condition is met, the source identifier to a second base station to which a second cell belongs is specifically:

reporting, by using the output unit, the source identifier including the RRC configuration index to the second base station to which the second cell belongs, so that the second base station determines, based on the RRC configuration index, the RRC configuration information used by the UE.

With reference to the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect, the seventh possible implementation of the seventh aspect, the eighth possible implementation of the seventh aspect, the ninth possible implementation of the seventh aspect, the tenth possible implementation of the seventh aspect, the eleventh possible implementation of the seventh aspect, the twelfth possible implementation of the seventh aspect, the thirteenth possible implementation of the seventh aspect, the fourteenth possible implementation of the seventh aspect, the fifteenth possible implementation of the seventh aspect, or the sixteenth possible implementation of the seventh aspect, in a seventeenth possible implementation of the seventh aspect, the first preset condition is that the UE needs to send uplink data, and the processing unit is further configured to: report, by using the output unit, the source identifier to the second base station to which the second cell belongs; and when or after reporting the source identifier, report an uplink data indication to the second base station to which the second cell belongs.

According to an eighth aspect, an embodiment of the present disclosure provides a base station, where the base station is a second base station, and the second base station may include: an output unit, a storage unit, and a processing unit;

the storage unit is configured to store program code, and the processing unit is configured to invoke the program code stored by the storage unit to perform the following steps:

receiving, by using the input unit, a source identifier reported by a user equipment (UE) in a low consumption state, where in the low consumption state, the UE stores a connection context of the UE in a connected state and performs cell camping based on a cell reselection criterion in a moving process, the first cell is a serving cell of the UE when the UE enters the low consumption state, the second cell is a current serving cell of the UE, and the source identifier includes a first UE identifier used to identify the UE in a first base station to which the first cell belongs; and sending the first UE identifier to a context storage node by using the output unit based on the source identifier, to notify the context storage node that it is learned that the current serving cell of the UE is the second cell.

With reference to the eighth aspect, in a first possible implementation of the eighth aspect, the source identifier includes at least one of an international mobile subscriber identity (IMSI), a temporary identity (T-MISI), and a radio network temporary identifier (RNTI) of the UE.

With reference to the eighth aspect or the first possible implementation of the eighth aspect, in a second possible implementation of the eighth aspect, the source identifier further includes indication information, and the indication information is used to notify the second base station that the UE is in the low consumption state.

With reference to the eighth aspect, the first possible implementation of the eighth aspect, or the second possible implementation of the eighth aspect, in a third possible implementation of the eighth aspect, the processing unit is further configured to send a system information broadcast by using the output unit before receiving, by using the input unit, the source identifier reported by the user equipment (UE) in the low consumption state, where the system information broadcast carries an indication for allowing the UE in the low consumption state to get access, so that the UE determines, based on the access indication, whether to send the source identifier to the second base station.

With reference to the eighth aspect, the first possible implementation of the eighth aspect, the second possible implementation of the eighth aspect, or the third possible implementation of the eighth aspect, in a fourth possible implementation of the eighth aspect, the processing unit is further configured to: before receiving, by using the input unit, the source identifier reported by the user equipment (UE) in the low consumption state, receive, by using the input unit, a random access preamble sent by the UE; and allocate a transmission resource of a preset size to the UE when the random access preamble falls within a preset range, so that the UE uses the transmission resource to send the source identifier.

With reference to the fourth possible implementation of the eighth aspect, in a fifth possible implementation of the eighth aspect, the random access preamble in the preset range is a predefined preamble or a received preamble configured by the second base station.

With reference to the eighth aspect, the first possible implementation of the eighth aspect, the second possible implementation of the eighth aspect, the third possible implementation of the eighth aspect, the fourth possible implementation of the eighth aspect, or the fifth possible implementation of the eighth aspect, in a sixth possible implementation of the eighth aspect, that the processing unit is configured to receive, by using the input unit, a source identifier reported by user equipment (UE) in a low consumption state is specifically:

receiving, by using the input unit, a random access preamble sent by the user equipment (UE) in the low consumption state;

allocating, to the UE by using the output unit based on the random access preamble, a dedicated UE identifier and a transmission resource that is used to transmit the source identifier, where the dedicated UE identifier is an identifier used to uniquely identify the UE in the second cell;

using the transmission resource to receive the source identifier by using the input unit; and sending confirmation information including the source identifier to the UE by using the output unit.

With reference to the sixth possible implementation of the eighth aspect, in a seventh possible implementation of the eighth aspect, the processing unit is further configured to: after receiving, by using the input unit, the random access preamble sent by the user equipment (UE) in the low consumption state, generate a response message corresponding to the reported source identifier, where the response message is encrypted based on a key stored in the connection context; and send the encrypted response message to the UE by using the output unit.

With reference to the sixth possible implementation of the eighth aspect or the seventh possible implementation of the eighth aspect, in an eighth possible implementation of the eighth aspect, that the processing unit is configured to send confirmation information including the source identifier to the UE by using the output unit is specifically:

sending a confirmation message that includes the source identifier and that carries an instruction instructing the UE to exit the low consumption state to the UE by using the output unit, so that the UE uses the dedicated UE identifier and exits the low consumption state based on the instruction.

With reference to the eighth aspect, the first possible implementation of the eighth aspect, the second possible implementation of the eighth aspect, the third possible implementation of the eighth aspect, the fourth possible implementation of the eighth aspect, the fifth possible implementation of the eighth aspect, the sixth possible implementation of the eighth aspect, the seventh possible implementation of the eighth aspect, or the eighth possible implementation of the eighth aspect, in a ninth possible implementation of the eighth aspect, that the processing unit is configured to send the first UE identifier to the context storage node by using the output unit based on the source identifier is specifically:

sending a notification message to the context storage node by using the output unit based on the source identifier, where the notification message carries the source identifier of the UE and a second cell identifier of the second cell in which the UE is currently located, so that the context storage node determines, based on the source identifier and the second cell identifier, that a serving cell on which the UE currently camps is the second cell.

With reference to the eighth aspect, the first possible implementation of the eighth aspect, the second possible implementation of the eighth aspect, the third possible implementation of the eighth aspect, the fourth possible implementation of the eighth aspect, the fifth possible implementation of the eighth aspect, the sixth possible implementation of the eighth aspect, the seventh possible implementation of the eighth aspect, the eighth possible implementation of the eighth aspect, or the ninth possible implementation of the eighth aspect, in a tenth possible implementation of the eighth aspect, the processing unit is further configured to: after sending the first UE identifier to the context storage node based on the source identifier, receive, by using the input unit, the source identifier and an uplink data indication that are sent by the UE;

send a connection context transfer request to the context storage node by using the output unit, where the connection context is the connection context of the UE in the connected state that is stored by the context storage node when the UE enters the low consumption state, and the context transfer request carries the source identifier of the UE; and receive, by using the input unit, the connection context transferred by the context storage node, and establish a connection to the UE based on the connection context.

With reference to the tenth possible implementation of the eighth aspect, in an eleventh possible implementation of the eighth aspect, the processing unit is further configured to: after receiving, by using the input unit, the connection context transferred by the context storage node, send a reallocated source identifier to the UE by using the output unit, where the reallocated source identifier includes a second UE identifier used to identify the UE in the second base station; and send, by using the output unit, an instruction to the UE to instruct the UE to exit the low consumption state.

With reference to the eighth aspect, the first possible implementation of the eighth aspect, the second possible implementation of the eighth aspect, the third possible implementation of the eighth aspect, the fourth possible implementation of the eighth aspect, the fifth possible implementation of the eighth aspect, the sixth possible implementation of the eighth aspect, the seventh possible implementation of the eighth aspect, the eighth possible implementation of the eighth aspect, the ninth possible implementation of the eighth aspect, the tenth possible implementation of the eighth aspect, or the eleventh possible implementation of the eighth aspect, in a twelfth possible implementation of the eighth aspect, the processing unit is further configured to: after sending the first UE identifier to the context storage node by using the output unit based on the source identifier, receive, by using the input unit, the connection context and the source identifier of the UE that are sent by the context storage node; and determine configuration information of the UE based on the received connection context and source identifier, and trigger, based on the source identifier, the UE to perform uplink access.

With reference to the twelfth possible implementation of the eighth aspect, in a thirteenth possible implementation of the eighth aspect, that the processing unit is configured to trigger, based on the source identifier, the UE to perform uplink access is specifically:

paging the UE based on the source identifier; or determining the dedicated UE identifier of the UE based on the source identifier, and sending an uplink access command to the UE based on the dedicated UE identifier; or determining the dedicated UE identifier of the UE based on the source identifier, and paging the UE based on the dedicated UE identifier.

With reference to the eighth aspect, the first possible implementation of the eighth aspect, the second possible implementation of the eighth aspect, the third possible implementation of the eighth aspect, the fourth possible implementation of the eighth aspect, the fifth possible implementation of the eighth aspect, the sixth possible implementation of the eighth aspect, the seventh possible implementation of the eighth aspect, the eighth possible implementation of the eighth aspect, the ninth possible implementation of the eighth aspect, the tenth possible implementation of the eighth aspect, the eleventh possible implementation of the eighth aspect, the twelfth possible implementation of the eighth aspect, or the thirteenth possible implementation of the eighth aspect, in a fourteenth possible implementation of the eighth aspect, the source identifier further includes a radio resource control (RRC) configuration index, and the processing unit is further configured to: after receiving, by using the input unit, the source identifier reported by the user equipment (UE) in the low consumption state, determine, based on the RRC configuration index, RRC configuration information used by the UE.

With reference to the eighth aspect, the first possible implementation of the eighth aspect, the second possible implementation of the eighth aspect, the third possible implementation of the eighth aspect, the fourth possible implementation of the eighth aspect, the fifth possible implementation of the eighth aspect, the sixth possible implementation of the eighth aspect, the seventh possible implementation of the eighth aspect, the eighth possible implementation of the eighth aspect, the ninth possible implementation of the eighth aspect, the tenth possible implementation of the eighth aspect, the eleventh possible implementation of the eighth aspect, the twelfth possible implementation of the eighth aspect, the thirteenth possible implementation of the eighth aspect, or the fourteenth possible implementation of the eighth aspect, in a fifteenth possible implementation of the eighth aspect, that the processing unit is configured to send the first UE identifier to the context storage node based on the source identifier is specifically:

sending the source identifier to the context storage node through an interface between the output unit and the context storage node based on the source identifier; or sending the source identifier to the context storage node by using the output unit and a core network based on the source identifier.

In the embodiments of the present disclosure, the low consumption state is designed, so that the UE in this state stores the connection context of the UE in the connected state, and performs cell camping based on the cell reselection criterion in the moving process. In addition, the UE in the low consumption state receives the source identifier allocated by the context storage node, and reports the source identifier to the current serving base station of the UE in the moving process when a specific condition is met. Finally, the serving base station sends the source identifier to the context storage node. In this way, both the serving base station and a source base station can learn of location information of the UE. To be specific, after the UE enters the low consumption state, the UE independently performs cell reselection-based mobility management and reports only location change information of the UE. The context storage node stores and traces the location change information of the UE, so that the base station does not strictly control UE movement. This simplifies a handover procedure and saves communication resources of a network device. Further, after the UE enters the low consumption state, both the context storage node and the UE store the connection context of the UE. Therefore, when the UE needs to perform uplink or downlink data communication, a base station can quickly obtain the connection context of the UE from the context storage node, and hand over the UE to the current serving base station of the UE to transmit data. This ensures data transmission efficiency.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the embodiments of the present disclosure may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), and a Universal Mobile Telecommunications System (UMTS).

It should be further understood that, in the embodiments of the present disclosure, a base station may be a base station (BTS) in GSM or CDMA, or may be a base station (NodeB) in WCDMA, or may be an evolved NodeB (eNB or eNodeB) in LTE, a base station device in a future 5G network, or the like, which is not limited in the present disclosure.

It should be further understood that, in the embodiments of the present disclosure, a UE may communicate with one or more core networks by using a radio access network (RAN). The UE may be referred to as an access terminal, a terminal device, a subscriber unit, a subscriber station, a mobile station, a remote station, a remote terminal, a mobile device, a user terminal, a terminal, a wireless communications device, a user agent, or a user apparatus. The UE may be a cellular phone, a cordless telephone set, a smartphone, a Session Initiation Protocol (SIP) phone, a wireless local loop (WLL) station, a smart band, a smart wearable device, an Moving Picture Experts Group Audio Layer III or Moving Picture Experts Group audio layer 3 (MP3) player, an Moving Picture Experts Group Audio Layer IV or Moving Picture Experts Group audio layer 4 (MP4) player, a personal digital assistant (PDA), a handheld device having a wireless communication function, a computing device or another processing device connected to a wireless modem, an in-vehicle device, a terminal device in the future 5G network, or the like.

Figure 1:
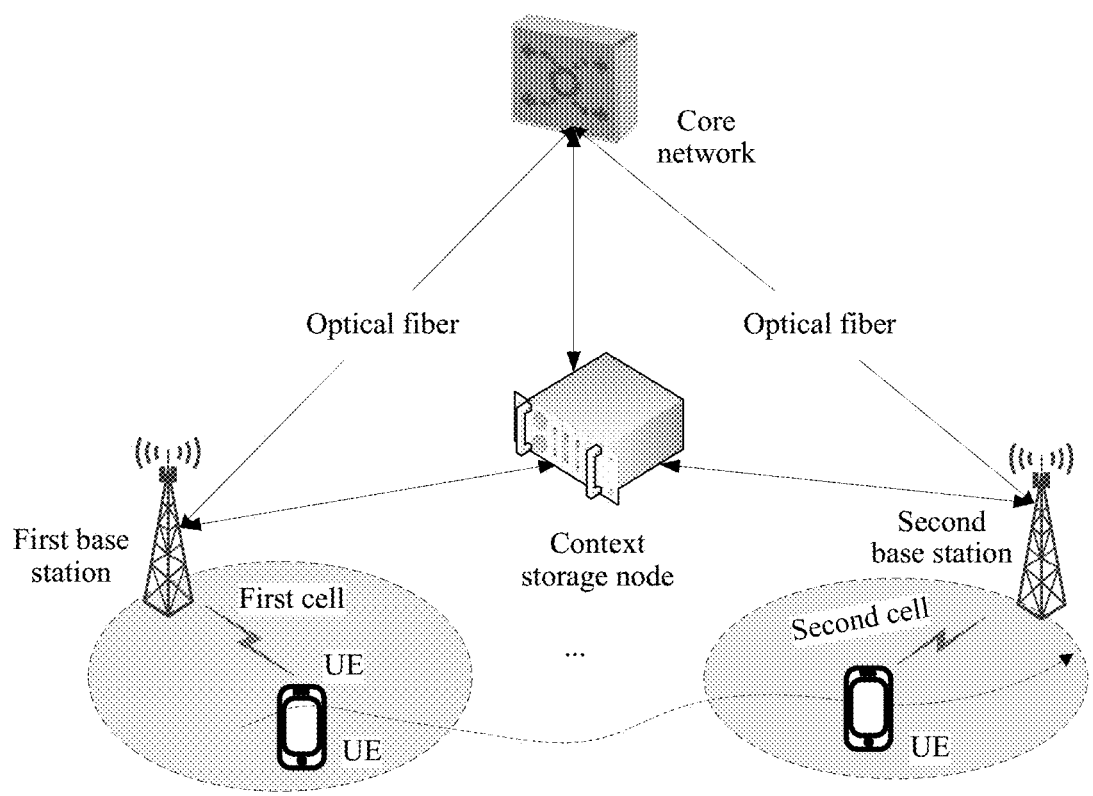
FIG. 1 is a schematic diagram of a mobility management network architecture according to the present disclosure.

To facilitate understanding of the embodiments of the present disclosure, the following first describes a mobility management network architecture on which the embodiments of the present disclosure are based. Referring to FIG. 1, the network architecture includes base stations, a context storage node, a core network, and user equipment UE. The UE completes data transmission through wireless communication with a corresponding first base station and a corresponding second base station in a process of moving from a first cell to a second cell. The base stations are connected to the core network by using optical fibers to complete data or service connection, management, bearing, and the like. In addition, the base stations and the context storage node may be connected in a wired or wireless manner. The context storage node and the core network are connected in a wired manner. It may be understood that each base station may include a plurality of cells. The first cell may be adjacent to or may be not adjacent to the second cell. It may be further understood that the network architecture in FIG. 1 is merely a preferred implementation in the embodiments of the present disclosure. A network architecture in the embodiments of the present disclosure includes but is not limited to the network architecture.

Figure 2A:
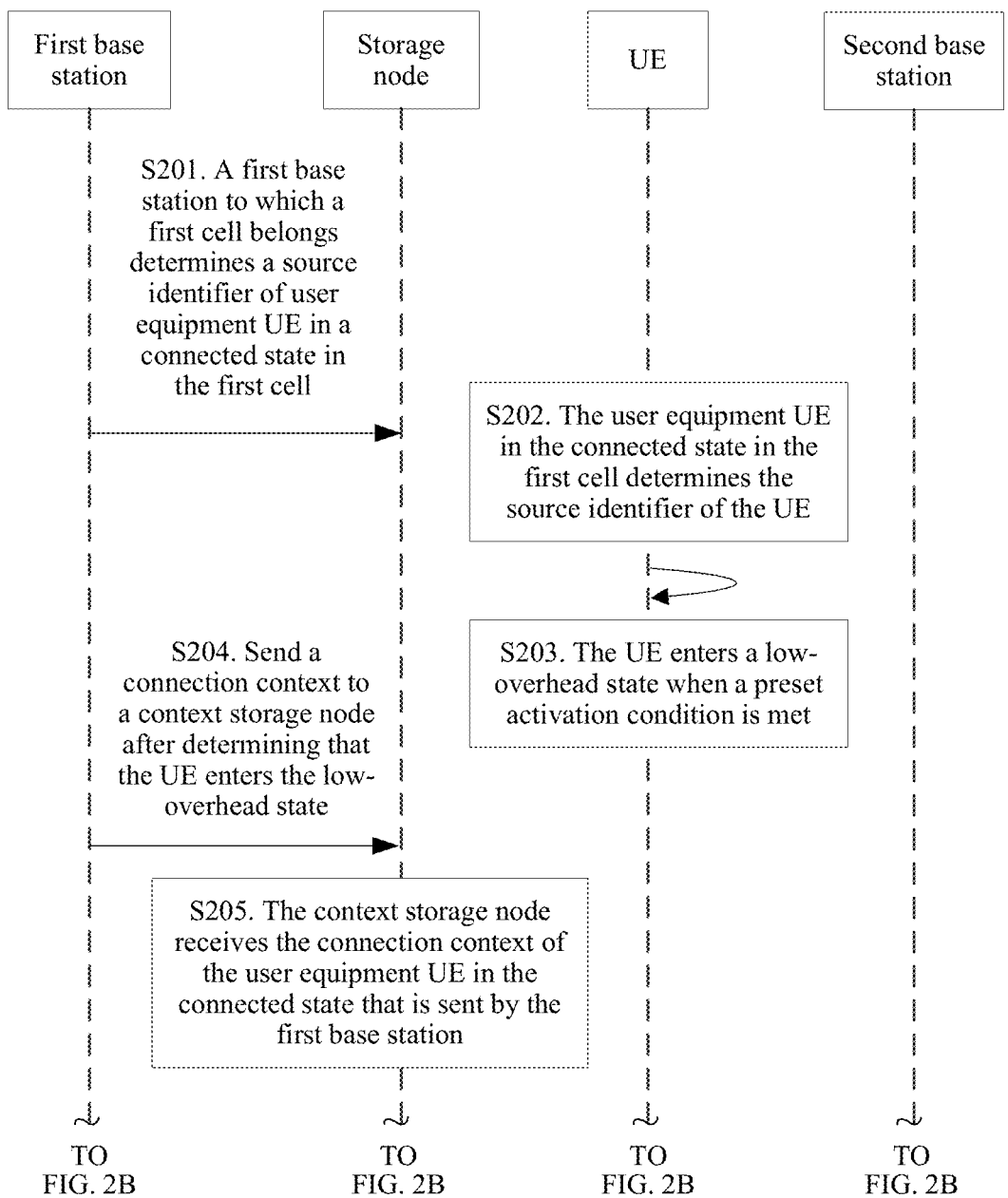
FIG. 2A and FIG. 2B are a schematic flowchart of a mobility management method according to the present disclosure.
Figure 2B:
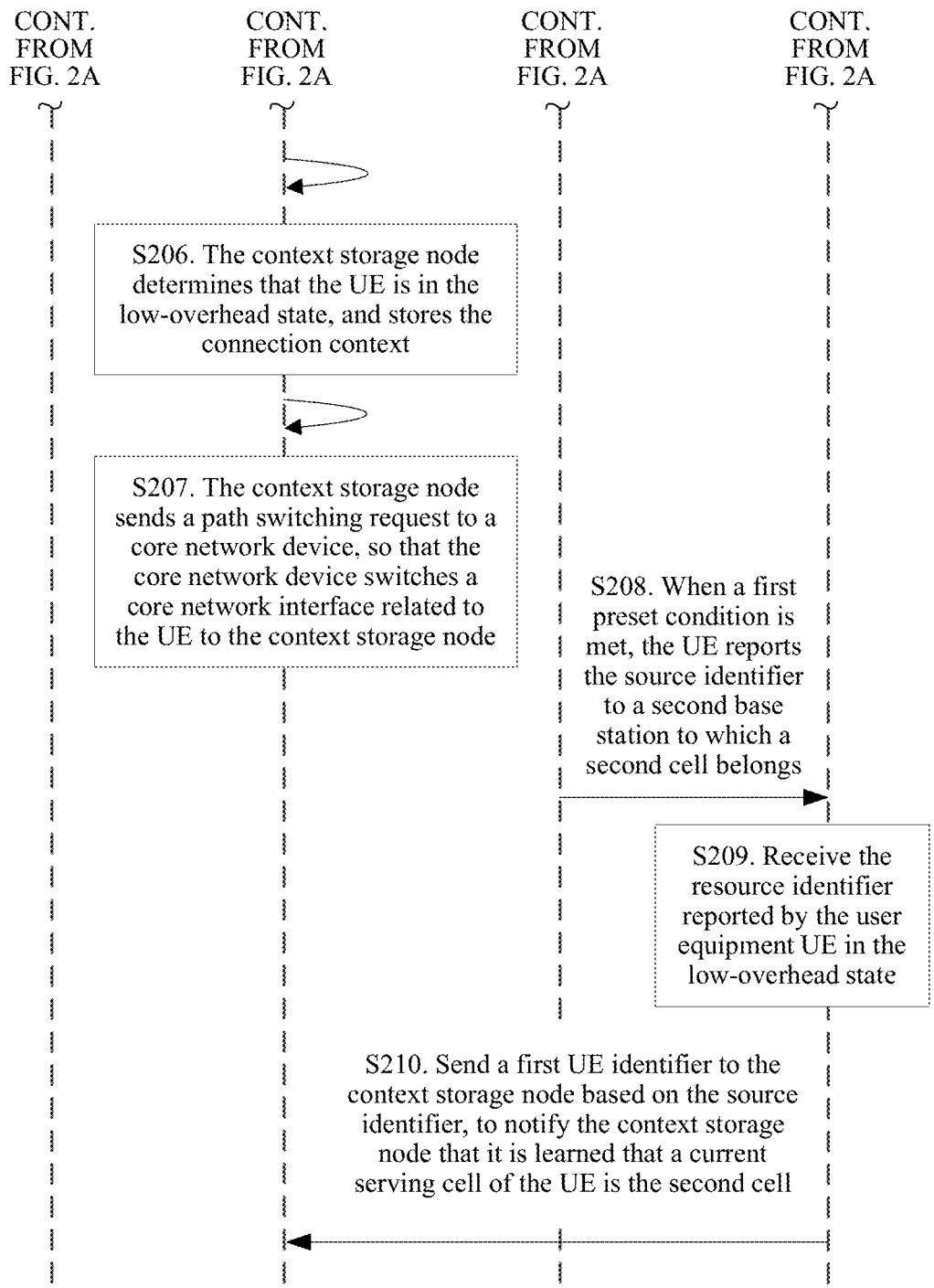

FIG. 2A and FIG. 2B are a schematic flowchart of a mobility management method according to an embodiment of the present disclosure. The following provides detailed description from interaction sides of a first base station, a context storage node, user equipment UE, and a second base station with reference to FIG. 2A and FIG. 2B. As shown in FIG. 2A and FIG. 2B, the method may include step S201 to step S210.

S201. The first base station to which a first cell belongs determines a source identifier of the user equipment (UE) in a connected state in the first cell, where the source identifier is used to identify the UE.

For example, a specific manner of determining, by the first base station, the source identifier of the user equipment (UE) in the connected state in the first cell may be:

The first base station receives the source identifier of the UE that is sent by the context storage node; or the first base station receives the source identifier of the UE that is sent by the UE; or the first base station receives the source identifier of the UE that is sent by a core network device.

Further, the source identifier includes at least one of an international mobile subscriber identity (IMSI), a temporary identity (T-MISI), and a radio network temporary identifier (RNTI) of the UE.

S202. The user equipment (UE) in the connected state in the first cell determines the source identifier of the UE, where the source identifier is used to identify the UE.

For example, the UE determines at least one of the international mobile subscriber identity (IMSI), the temporary identity (T-MISI), and the radio network temporary identifier (RNTI) of the UE as the source identifier, or receives the source identifier sent by the first base station. The first base station is a base station to which the first cell belongs. Specifically, the radio network temporary identifier includes a first cell identifier used to identify the first cell and a first UE identifier used to uniquely identify the UE in the first cell. Alternatively, the source identifier includes a first base station identifier used to uniquely identify the first base station and a first UE identifier used to uniquely identify the UE in the first base station. Specifically, for example, the first cell identifier includes at least one of a cell global identifier ECGI, a physical cell identifier PCI, and a cell identifier that includes an identifier of an area and an identifier of the first cell in the area. The area is a specific cell range divided on a network. For example, if 256 cells are an area, an identifier of the area includes eight bits, the area supports a maximum of 256 cells, and an identifier of a cell in the area includes eight bits. Accordingly, a cell identifier includes 16 bits, the first eight bits are the identifier of the area, and the last eight bits are the identifier of the cell in the area. Likewise, the base station identifier may include an identifier of an area and an identifier of the base station in the area.

S203. The UE enters a low consumption state when a preset activation condition is met, where in the low consumption state, the UE stores a connection context of the UE in the connected state and performs cell camping based on a cell reselection criterion in a moving process.

For example, for a UE side, the preset activation condition includes at least one of the following conditions:
the UE receives a control instruction that is sent by the first base station and that instructs to enter the low consumption state;
the UE leaves the first cell;
no data transmission is performed between the UE and the first base station in first preset duration;
a timing advance timer (TA timer) of the UE expires, or the TA timer of the UE expires and the TA timer does not rerun in second preset duration; and
after entering a discontinuous reception (DRX) state, the UE does not exit the DRX state in third preset duration.

Further, the UE exits the low consumption state when a second preset condition is met. The second preset condition includes at least one of the following conditions:
a serving cell on which the UE currently camps changes;

the serving cell on which the UE currently camps goes beyond a specified cell set range;

the serving cell on which the UE currently camps and the first cell do not belong to a same preset area or a same base station;

the UE sends the source identifier to the second base station, and receives an access rejection indication sent by the second base station for the source identifier;

the UE reads a system information broadcast of a second cell, and the system information broadcast carries no indication for allowing the UE in the low consumption state to get access; and the UE needs to send uplink data. That the serving cell on which the UE currently camps and the first cell do not belong to a same preset area or a same base station is specifically: The UE determines, based on an area identifier carried in a system information broadcast of the first cell and an area identifier carried in a system information broadcast of the cell that is currently camped on, whether the serving cell on which the UE currently camps and the first cell belong to the same preset area. Alternatively, the UE determines, based on a base station identifier carried in a system information broadcast of the first cell and a base station identifier carried in a system information broadcast of the cell that is currently camped on, whether the serving cell on which the UE currently camps and the first cell belong to the same base station.

Still further, the UE clears the connection context and enters an idle state when the second preset condition is met. Yet further, the UE notifies an upper layer of the UE that the UE exits the low consumption state.

In an optional implementation, the connection context includes a configuration parameter related to a connection between the first base station and the UE, and may specifically include a radio bearer configuration of the UE and identifier information of the UE. The radio bearer configuration includes a signaling radio bearer configuration and/or a data radio bearer configuration. The identifier information of the UE may include the source identifier of the UE. Further, the connection context may include key information. The key information is used when encrypted transmission is performed or UE verification information is generated.

In an optional implementation, after the UE enters the low consumption state when the preset activation condition is met, the UE receives radio resource control (RRC) configuration information sent by the first base station. The RRC configuration information includes an RRC configuration index. The RRC configuration index is used to indicate the RRC configuration information. The UE in the low consumption state uses the RRC configuration information.

In an optional implementation, after the UE enters the low consumption state when the preset activation condition is met, the UE releases a dedicated UE identifier of the UE in the first cell.

In an optional implementation, after the UE enters the low consumption state when the preset activation condition is met, the UE monitors paging based on the source identifier.

It should be noted that the low consumption state in the present disclosure is a UE state defined in the present disclosure. Characteristics of the low consumption state include storing the connection context and performing mobility based on cell reselection. The low consumption state features a low signaling overhead and low power consumption. Therefore, this state is named low consumption state in the present disclosure. The low consumption state may be a sub-state of the connected state or an enhanced state of the idle state, which is not limited in the present disclosure.

S204. The first base station sends the connection context to the context storage node after determining that the UE enters the low consumption state.

For example, for a side of the first base station, the preset activation condition includes at least one of the following conditions:

the first base station sends the control instruction used to instruct the UE to enter the low consumption state to the UE;

no data transmission is performed between the first base station and the UE in the first preset duration;

the first base station determines that the timing advance timer (TA timer) of the UE expires, or the first base station determines that the TA timer of the UE expires and the TA timer does not rerun in the second preset duration; and the first base station determines that the UE does not exit, after entering the discontinuous reception (DRX) state, the DRX state in the third preset duration. The control instruction that is sent by the first base station to the UE and that is used to instruct the UE to enter the low consumption state may be RRC signaling, or may be MAC layer signaling or physical layer signaling. The control instruction and the source identifier may be sent to the UE in a same message, or may be sent to the UE in different messages, which is not limited in the present disclosure.

In an optional implementation, the first base station stores the connection context of the UE in the connected state after determining that the UE enters the low consumption state. The UE enters the low consumption state when the preset activation condition is met. In the low consumption state, the UE stores the connection context and performs cell camping based on the cell reselection criterion in the moving process.

In an optional implementation, after the first base station determines that the UE enters the low consumption state, the first base station further sends the radio resource control (RRC) configuration information to the UE for use by the UE in the low consumption state. Further, the RRC configuration information includes the RRC configuration index. The configuration index is used to indicate the RRC configuration information. Optionally, the RRC configuration includes the radio bearer configuration of the UE in the low consumption state. The radio bearer configuration includes the signaling radio bearer configuration and/or the data radio bearer configuration. Further, optionally, the RRC configuration may include the key information. The key information is used when encrypted transmission is performed.

In an optional implementation, after the first base station sends the connection context to the context storage node, the first base station releases the connection context to save storage space of the base station.

S205. The context storage node receives the connection context of the user equipment (UE) in the connected state that is sent by the first base station, where in the low consumption state, the UE stores the connection context and performs cell camping based on the cell reselection criterion in the moving process.

In an optional implementation, before receiving the connection context of the user equipment (UE) in the connected state that is sent by the first base station, the context storage node allocates the source identifier of the UE and sends the source identifier to the first base station.

S206. The context storage node determines that the UE is in the low consumption state, and stores the connection context, where in the low consumption state, the UE stores the connection context and performs cell camping based on the cell reselection criterion in the moving process.

In an optional implementation, after the context storage node determines that the UE is in the low consumption state, the context storage node further receives a connection context transfer request sent by the second base station, where the connection context is the connection context of the UE in the connected state that is stored by the context storage node when the UE enters the low consumption state, the context transfer request carries the source identifier, and the second base station is a current serving base station of the UE; and sends the connection context to the second base station based on the source identifier carried in the transfer request. Further, that the context storage node sends the connection context to the second base station further includes: The context storage node further sends a core network data path switching indication to the second base station, so that the second base station determines whether to switch the core network data path to the second base station.

In an optional implementation, after the context storage node determines that the UE is in the low consumption state, the context storage node further receives and stores a notification message sent by the second base station. The notification message carries the source identifier of the UE and a cell identifier of a serving cell in which the UE is currently located, so that the first base station determines the current serving cell of the UE based on the notification message. Further, the notification message carries verification information of the UE. The verification information is identity verification information generated by the UE based on the source identifier and a key that is stored in the connection context. After the context storage node receives and stores the notification message sent by the second base station, the context storage node further determines whether the UE is a valid UE based on the source identifier and the verification information.

In an optional implementation, after the context storage node determines that the UE is in the low consumption state, the context storage node sends the connection context and the source identifier to the second base station when downlink data of the UE arrives at the context storage node. The connection context is the connection context of the UE in the connected state that is stored by the context storage node when the UE enters the low consumption state. The second base station is the current serving base station of the UE. Further, that the context storage node sends the connection context to the second base station further includes: The context storage node further sends a core network data path switching indication to the second base station, so that the second base station determines whether to switch the core network data path to the second base station.

S207. The context storage node sends a path switching request to a core network device, so that the core network device switches a core network interface related to the UE to the context storage node.

It should be noted that there is no specific execution sequence between this step and step S206. That is, step S207 may be performed first, and then step S206 is performed, or step S206 and step S207 may be simultaneously performed.

S208. When a first preset condition is met, the UE reports the source identifier to the second base station to which a second cell belongs, where the second cell is a serving cell on which the UE currently camps.

For example, the first preset condition includes:
the serving cell on which the UE currently camps changes; or the second cell on which the UE currently camps goes beyond a specified cell set range; or the second cell on which the UE currently camps and the first cell do not belong to a same preset area or a same base station; or the UE needs to send uplink data.

In an optional implementation, when the first preset condition is met, before the UE reports the source identifier to the second base station, the UE receives and reads a system information broadcast of the second cell. If the system information broadcast carries an indication for allowing the UE in the low consumption state to get access, the UE determines, based on the access indication, to send the source identifier to the second base station.

In an optional implementation, when the first preset condition is met, before the UE reports the source identifier to the second base station, the UE sends a random access preamble in a preset range to the second base station, where the random access preamble in the preset range is used to indicate that the source identifier needs to be sent to the second base station or a message of a length greater than a preset length threshold needs to be sent to the second base station; receives a transmission resource of a preset size that is allocated by the second base station and that is used to transmit the source identifier; and uses the transmission resource to send the source identifier to the second base station. Further, the random access preamble in the preset range is a predefined preamble or a received preamble configured by the second base station. Still further, using the transmission resource to send the source identifier to the second base station is specifically: The UE receives an encrypted response message sent by the second base station, and performs decryption based on the key stored in the connection context; and after the decryption succeeds, the UE establishes a connection to the second base station based on the response message, and then sends the source identifier to the second base station.

In an optional implementation, after the UE reports the source identifier to the second base station, the UE receives an encrypted response message sent by the second base station, and performs decryption based on the key stored in the connection context; and the UE establishes a connection to the second base station based on the response message after the decryption succeeds. Specifically, if no verification information is carried in a process of reporting the source identifier by the UE, the base station cannot determine validity of the UE based on the source identifier. Therefore, the base station encrypts confirmation information for the source identifier. The UE performs decryption based on the stored key. If the decryption succeeds, it indicates that the UE is a valid UE, and the connection to the second base station may be further established based on the response message. The response message may be an RRC message or a MAC control message. The RRC message may be an RRC connection establishment confirmation message, an RRC connection re-establishment message, or an RRC connection reconfiguration message. The source identifier may be sent to the second base station by using an RRC connection establishment request or an RRC connection re-establishment request.

In an optional implementation, that the UE reports the source identifier to the second base station may be specifically: The UE reports the source identifier including the RRC configuration index to the second base station, so that the second base station determines, based on the RRC configuration index, the RRC configuration information used by the UE.

In an optional implementation, that the UE reports the source identifier to the second base station may be specifically: The UE sends a random access preamble to the second base station; receives a dedicated UE identifier that is sent by the second base station and a transmission resource that is allocated by the second base station based on the random access preamble and that is used to transmit the source identifier, where the dedicated UE identifier is an identifier used to uniquely identify the UE in the second cell; uses the transmission resource to send the source identifier to the second base station; receives confirmation information that is sent by the second base station and that includes the source identifier; and determines, based on the confirmation information, whether to use the dedicated UE identifier. Further, that the UE determines, based on the confirmation information, whether to use the dedicated UE identifier is specifically:

The UE determines, based on the confirmation information, not to use the dedicated UE identifier; or the UE uses the dedicated UE identifier based on the confirmation information, and exits the low consumption state; or the UE uses the dedicated UE identifier based on the confirmation information, and remains in the low consumption state; or the UE uses the dedicated UE identifier and exits the low consumption state based on an instruction that is carried in the confirmation information and that instructs the UE to exit the low consumption state. Still further, after using the dedicated UE identifier, the UE updates the key in the connection context based on a cell identifier of the serving cell on which the UE currently camps. Yet further, the source identifier reported by the UE to the second base station further includes verification information. The verification information is identity verification information generated by the UE based on the source identifier and the updated key.

In an optional implementation, the source identifier reported by the UE further includes indication information. The indication information is used to notify the second base station that the UE is in the low consumption state.

In an optional implementation, the first preset condition is that the UE needs to send uplink data. That the UE reports the source identifier to the second base station to which the second cell belongs is specifically: After or when reporting the source identifier, the UE reports an uplink data indication to the second base station to which the second cell belongs.

It should be noted that, after the UE enters the low consumption state, starting of a cell reselection process depends on whether the UE moves. When the first preset condition is met, the serving cell of the UE may still be the first cell or another cell different from the first cell. Therefore, the second cell and the first cell may be a same cell, or may be different cells.

S209. The second base station to which the second cell belongs receives the source identifier reported by the user equipment (UE) in the low consumption state.

For example, the first cell is a serving cell of the UE when the UE enters the low consumption state. The second cell is the current serving cell of the UE. The source identifier includes the first UE identifier used to identify the UE in the first base station to which the first cell belongs.

In an optional implementation, before the second base station receives the source identifier reported by the user equipment (UE) in the low consumption state, the second base station sends a system information broadcast. The system information broadcast carries an indication for allowing the UE in the low consumption state to get access, so that the UE determines, based on the access indication, whether to send the source identifier to the second base station. Specifically, the second base station controls, by using the system information broadcast, whether to allow the UE in the low consumption state to get access. Therefore, the UE determines, based on an indication carried in the broadcast, whether the source identifier can be reported.

In an optional implementation, before receiving the source identifier reported by the user equipment (UE) in the low consumption state, the second base station receives the random access preamble sent by the UE; and allocates the transmission resource of the preset size to the UE when the random access preamble falls within the preset range, so that the UE uses the transmission resource to send the source identifier. Further, the random access preamble in the preset range is a predefined preamble or a received preamble configured by the second base station.

In an optional implementation, that the second base station receives the source identifier reported by the user equipment (UE) in the low consumption state is specifically: The second base station to which the second cell belongs receives the random access preamble sent by the user equipment (UE) in the low consumption state; allocates, to the UE based on the random access preamble, the dedicated UE identifier and the transmission resource that is used to transmit the source identifier, where the dedicated UE identifier is the identifier used to uniquely identify the UE in the second cell; uses the transmission resource to receive the source identifier; and sends the confirmation information including the source identifier to the UE. Further, that the second base station sends the confirmation information including the source identifier to the UE is specifically: The second base station sends a confirmation message that includes the source identifier and that carries an instruction instructing the UE to exit the low consumption state to the UE, so that the UE uses the dedicated UE identifier and exits the low consumption state based on the instruction.

In an optional implementation, the source identifier that is reported by the UE and received by the second base station further includes the radio resource control (RRC) configuration index. After receiving the source identifier reported by the UE in the low consumption state, the second base station determines, based on the RRC configuration index, the RRC configuration information used by the UE.

In an optional implementation, after receiving the random access preamble sent by the user equipment (UE) in the low consumption state, the second base station further generates a response message corresponding to the reported source identifier, where the response message is encrypted based on the key stored in the connection context; and sends the encrypted response message to the UE.

S210. The second base station sends a first UE identifier to the context storage node based on the source identifier, to notify the context storage node that it is learned that a current serving cell of the UE is the second cell.

For example, the second base station sends the source identifier to the context storage node through an interface between the second base station and the context storage node based on the source identifier; or sends the source identifier to the context storage node by using a core network based on the source identifier.

In an optional implementation, the second base station sends the notification message to the context storage node. The notification message carries the source identifier of the UE and a second cell identifier of the second cell in which the UE is currently located. The second cell is the serving cell on which the UE currently camps. The context storage node receives the notification message sent by the second base station, and determines, based on the source identifier and the second cell identifier, that the serving cell on which the UE currently camps is the second cell. Further, the notification message carries the verification information of the UE. The verification information is the identity verification information generated by the UE based on the source identifier and the key that is included in the connection context. The context storage node determines whether the UE is a valid UE based on the source identifier and the verification information.

In an optional implementation, after sending the first UE identifier to the context storage node based on the source identifier, the second base station receives the connection context and the source identifier of the UE that are sent by the context storage node; determines configuration information of the UE based on the received connection context and source identifier; and triggers, based on the source identifier, the UE to perform uplink access.

In this embodiment of the present disclosure, an interaction procedure implemented in the present disclosure is not limited to simultaneously performing all steps. That is, processing steps of the UE, the first base station, and the second base station may be respectively and independently performed in the UE, the first base station device, and the second base station device. Separate implementation of any device, including the UE, the first base station, and the second base station, falls within the protection scope of this embodiment of the present disclosure.

In this embodiment of the present disclosure, the low consumption state is designed, so that the UE in this state stores the connection context of the UE in the connected state, and performs cell camping based on the cell reselection criterion in the moving process. In addition, the UE in the low consumption state receives the source identifier allocated by the context storage node, and reports the source identifier to the current serving base station of the UE in the moving process when a specific condition is met. Finally, the serving base station sends the source identifier to the context storage node. In this way, both the serving base station and a source base station can learn of location information of the UE. To be specific, after the UE enters the low consumption state, the UE independently performs cell reselection-based mobility management and reports only location change information of the UE. The context storage node stores and traces the location change information of the UE, so that the base station does not strictly control UE movement. This simplifies a handover procedure and saves communication resources of a network device. Further, after the UE enters the low consumption state, both the context storage node and the UE store the connection context of the UE. Therefore, when the UE needs to perform uplink or downlink data communication, a base station can quickly obtain the connection context of the UE from the context storage node, and hand over the UE to the current serving base station of the UE to transmit data. This ensures data transmission efficiency.

Figure 3A:
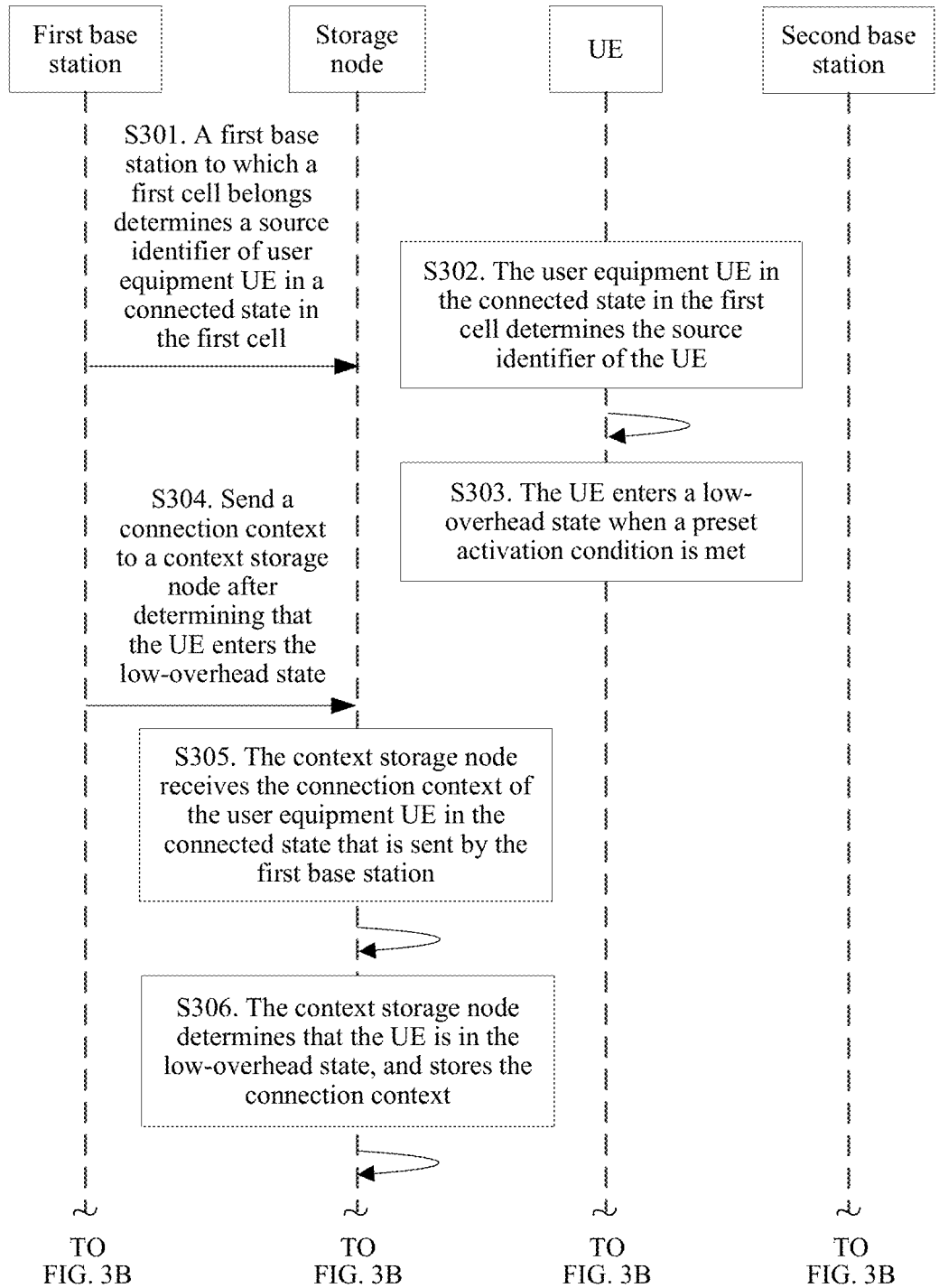
FIG. 3A and FIG. 3B are a schematic flowchart of another mobility management method according to the present disclosure.
Figure 3B:
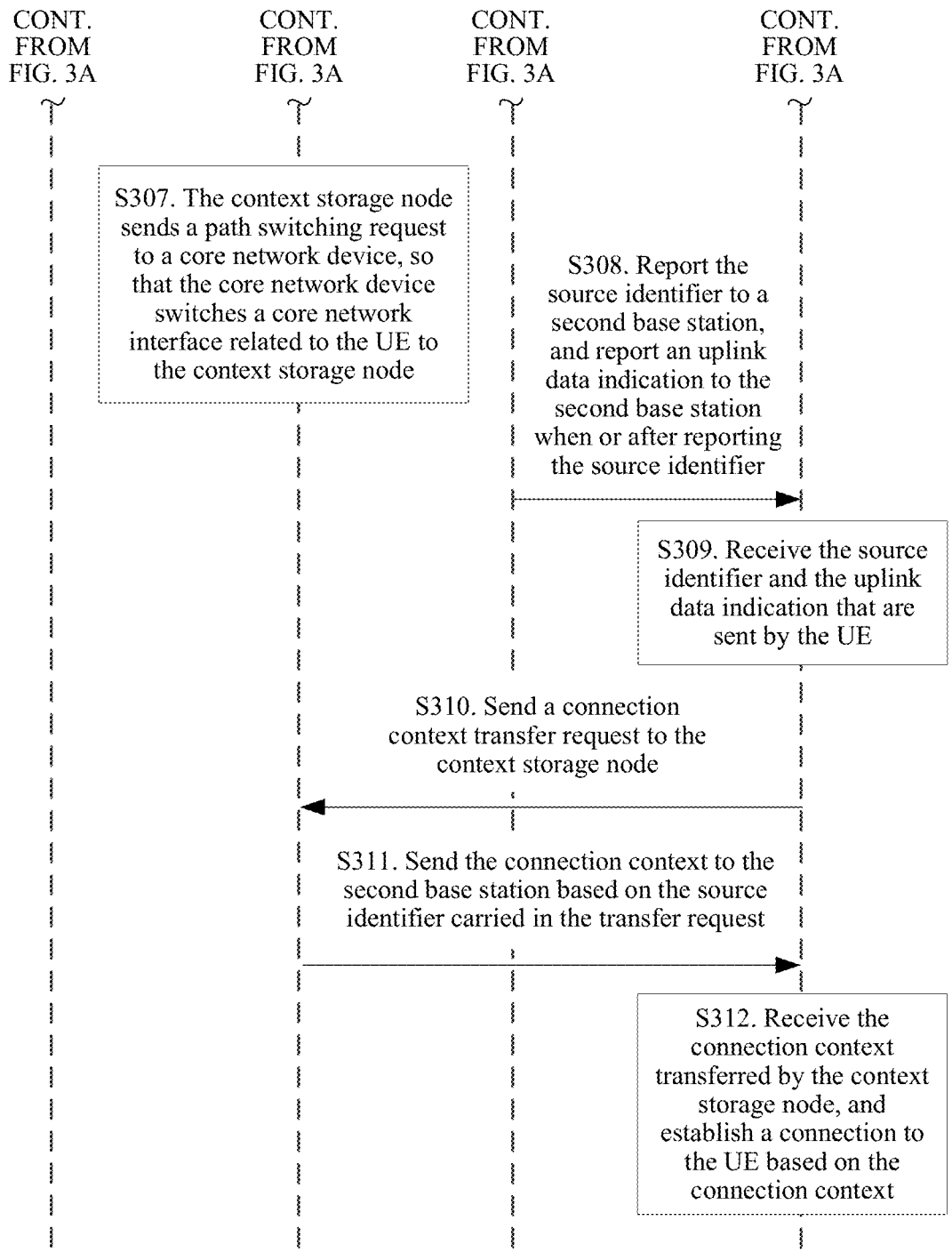

FIG. 3A and FIG. 3B are a schematic flowchart of another mobility management method according to an embodiment of the present disclosure. The following provides description from interaction sides of a first base station, a context storage node, UE, and a second base station with reference to FIG. 3A and FIG. 3B. As shown in FIG. 3A and FIG. 3B, the method may include step S301 to step S312.

S301. The first base station to which a first cell belongs determines a source identifier of the user equipment (UE) in a connected state in the first cell, where the source identifier is used to identify the UE.

S302. The user equipment (UE) in the connected state in the first cell determines the source identifier of the UE, where the source identifier is used to identify the UE.

S303. The UE enters a low consumption state when a preset activation condition is met, where in the low consumption state, the UE stores a connection context of the UE in the connected state and performs cell camping based on a cell reselection criterion in a moving process.

S304. The first base station sends the connection context to the context storage node after determining that the UE enters the low consumption state.

In an optional implementation, after the first base station determines that the UE enters the low consumption state, the first base station stores the connection context of the UE in the connected state. In the low consumption state, the UE stores the connection context and performs cell camping based on the cell reselection criterion in the moving process.

S305. The context storage node receives the connection context of the user equipment (UE) in the connected state that is sent by the first base station, where in the low consumption state, the UE stores the connection context and performs cell camping based on the cell reselection criterion in the moving process.

S306. The context storage node determines that the UE is in the low consumption state, and stores the connection context, where in the low consumption state, the UE stores the connection context and performs cell camping based on the cell reselection criterion in the moving process.

S307. The context storage node sends a path switching request to a core network device, so that the core network device switches a core network interface related to the UE to the context storage node.

For example, for step S301 to step S307, refer to step S201 to step S207 in the embodiment shown in FIG. 2A and FIG. 2B. Details are not described herein again.

S308. Report the source identifier to the second base station, and report an uplink data indication to the second base station when or after reporting the source identifier.

For example, a first preset condition is that the UE needs to send uplink data. That the UE reports the source identifier to the second base station to which a second cell belongs is specifically: After or when reporting the source identifier, the UE reports the uplink data indication to the second base station to which the second cell belongs.

S309. The second base station receives the source identifier and the uplink data indication that are sent by the UE.

S310. The second base station sends a connection context transfer request to the context storage node.

S311. The context storage node sends the connection context to the second base station based on the source identifier carried in the transfer request.

S312. The second base station receives the connection context transferred by the context storage node, and establishes a connection to the UE based on the connection context.

In an optional implementation, after receiving the connection context, the second base station determines configuration information of the UE based on the source identifier, and triggers, based on the source identifier, the UE to perform uplink access. Further, triggering, based on the source identifier, the UE to perform uplink access is specifically:

paging the UE based on the source identifier; or determining a dedicated UE identifier of the UE based on the source identifier, and sending an uplink access command to the UE based on the dedicated UE identifier; or determining a dedicated UE identifier of the UE based on the source identifier, and paging the UE based on the dedicated UE identifier.

In an optional implementation, after receiving the connection context transferred by the context storage node, the second base station further sends a reallocated source identifier to the UE, where the reallocated source identifier includes a second UE identifier used to identify the UE in the second base station; and sends an instruction to the UE to instruct the UE to exit the low consumption state.

In this embodiment of the present disclosure, an interaction procedure implemented in the present disclosure is not limited to simultaneously performing all steps. That is, processing steps of the UE, the first base station, and the second base station may be respectively and independently performed in the UE, the first base station device, and the second base station device. Separate implementation of any device, including the UE, the first base station, and the second base station, falls within the protection scope of this embodiment of the present disclosure.

In this embodiment of the present disclosure, the low consumption state is designed, so that the UE in this state stores the connection context of the UE in the connected state, and performs cell camping based on the cell reselection criterion in the moving process. In addition, the UE in the low consumption state receives the source identifier sent by a source base station, and reports the source identifier to the current serving base station of the UE in the moving process when a specific condition is met. Finally, the serving base station sends the source identifier to the source base station. In this way, both the serving base station and the source base station can learn of location information of the UE. To be specific, after the UE enters the low consumption state, the UE independently performs cell reselection-based mobility management and reports only location change information of the UE. This simplifies a handover procedure and saves communication resources of a network device. Further, after the UE enters the low consumption state, both the source base station and the UE store the connection context of the UE. Therefore, when the UE needs to perform uplink or downlink data communication, the connection context of the UE may be switched to the current serving base station of the UE, for data transmission. This ensures data transmission efficiency.

Figure 4A:
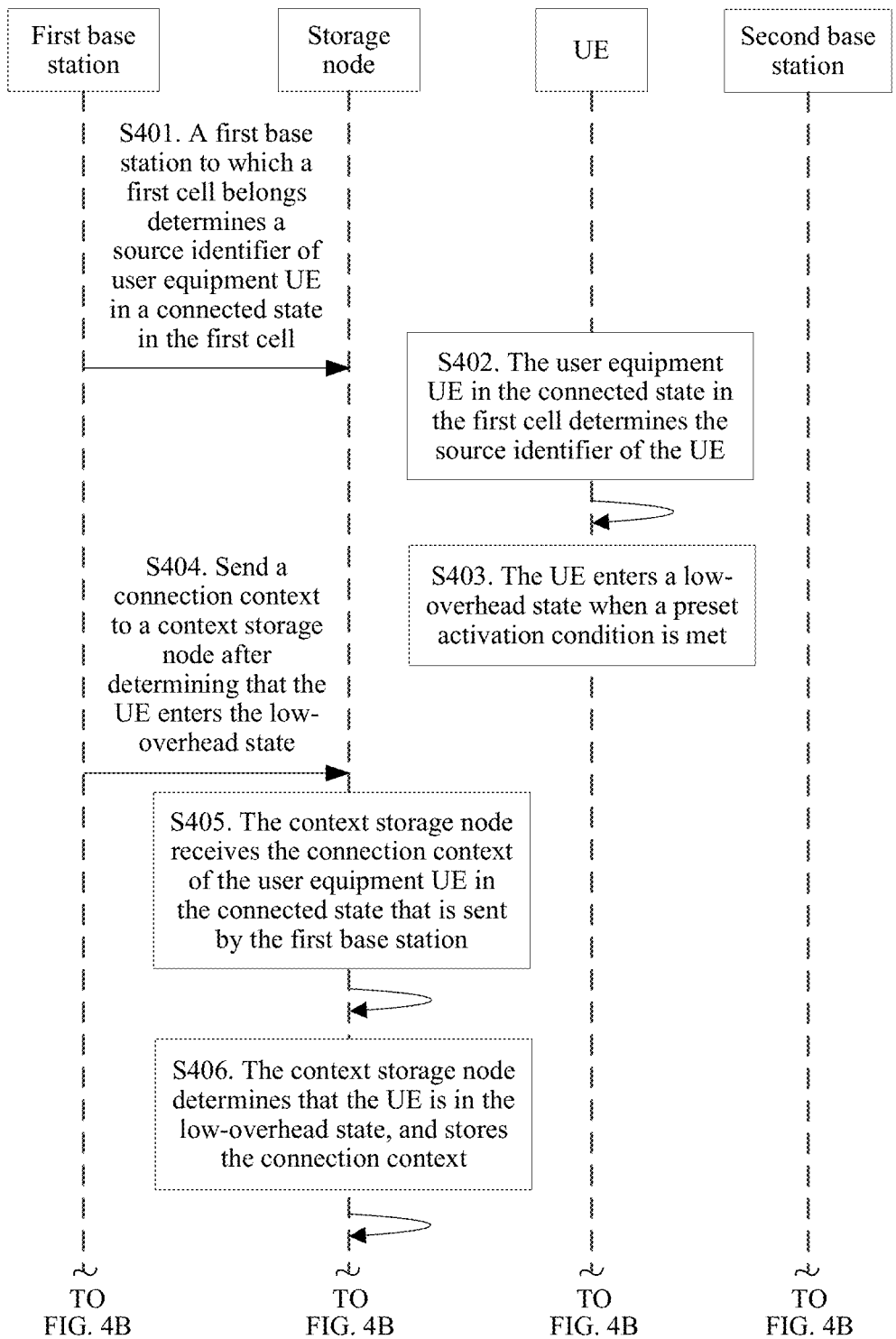
FIG. 4A and FIG. 4B are a schematic flowchart of still another mobility management method according to the present disclosure.
Figure 4B:
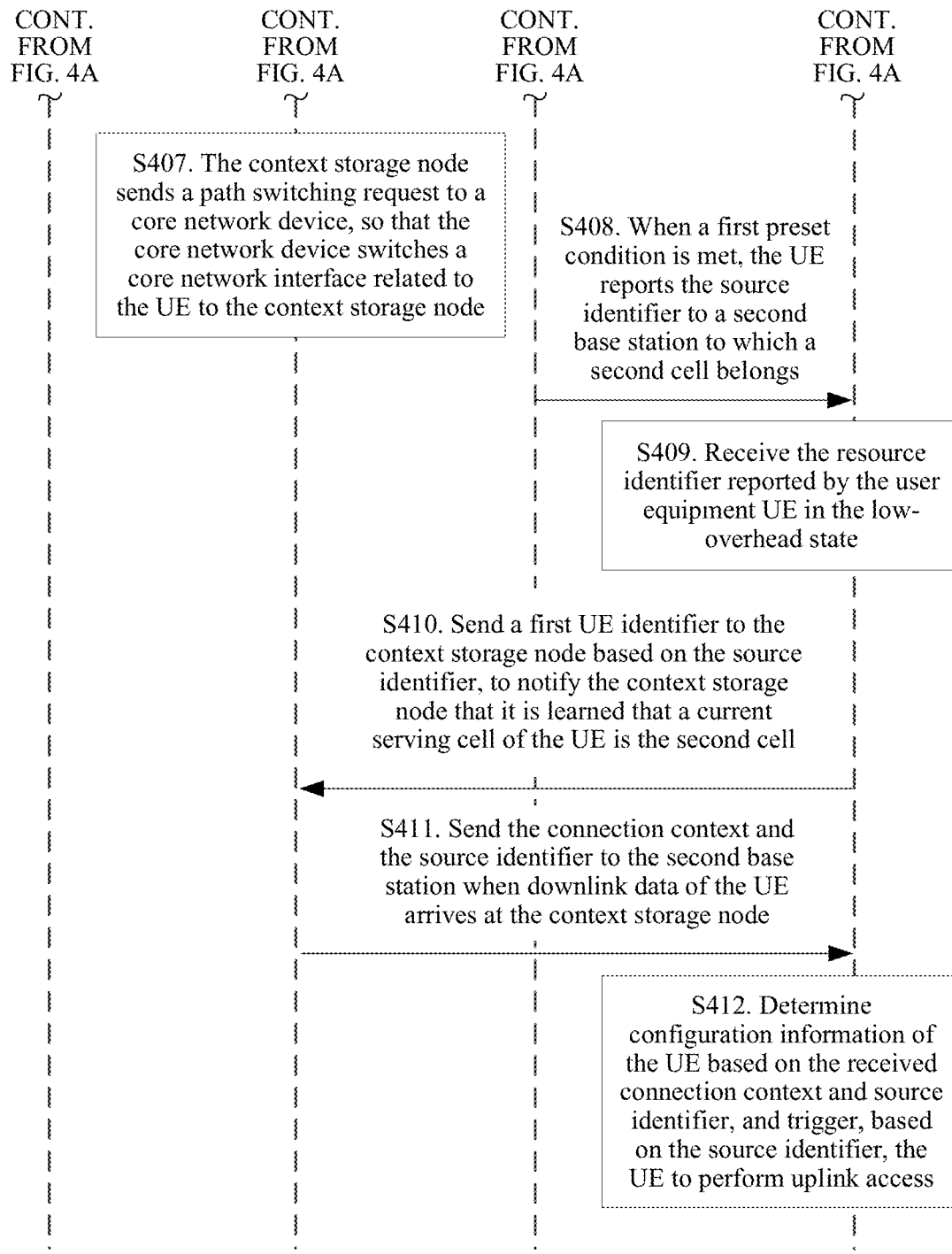

FIG. 4A and FIG. 4B are a schematic flowchart of still another mobility management method according to an embodiment of the present disclosure. The following provides description from interaction sides of a first base station, a context storage node, UE, and a second base station with reference to FIG. 4A and FIG. 4B. As shown in FIG. 4A and FIG. 4B, the method may include step S401 to step S412.

S401. The first base station to which a first cell belongs determines a source identifier of the user equipment (UE) in a connected state in the first cell, where the source identifier is used to identify the UE.

S402. The user equipment (UE) in the connected state in the first cell determines the source identifier of the UE, where the source identifier is used to identify the UE.

S403. The UE enters a low consumption state when a preset activation condition is met, where in the low consumption state, the UE stores a connection context of the UE in the connected state and performs cell camping based on a cell reselection criterion in a moving process.

S404. The first base station sends the connection context to the context storage node after determining that the UE enters the low consumption state.

S405. The context storage node receives the connection context of the user equipment (UE) in the connected state that is sent by the first base station, where in the low consumption state, the UE stores the connection context and performs cell camping based on the cell reselection criterion in the moving process.

S406. The context storage node determines that the UE is in the low consumption state, and stores the connection context, where in the low consumption state, the UE stores the connection context and performs cell camping based on the cell reselection criterion in the moving process.

S407. The context storage node sends a path switching request to a core network device, so that the core network device switches a core network interface related to the UE to the context storage node.

S408. When a first preset condition is met, the UE reports the source identifier to the second base station to which a second cell belongs, where the second cell is a serving cell on which the UE currently camps.

S409. The second base station to which the second cell belongs receives the source identifier reported by the user equipment (UE) in the low consumption state.

S410. Send a first UE identifier to the context storage node based on the source identifier, to notify the context storage node that it is learned that a current serving cell of the UE is the second cell.

For example, for step S401 to step S410, refer to step S201 to step S210 in the embodiment shown in FIG. 2A and FIG. 2B. Details are not described herein again.

S411. The context storage node sends the connection context and the source identifier to the second base station when downlink data of the UE arrives at the context storage node.

For example, when the downlink data of the UE arrives at the context storage node, the context storage node sends the connection context and the source identifier of the UE to the second base station, so that the second base station performs data communication with the UE based on the connection context. In addition, the context storage node forwards the downlink data of the UE to the second base station, so that the second base station that is the current serving base station of the UE can send the downlink data to the UE.

S412. The second base station determines configuration information of the UE based on the received connection context and source identifier, and triggers, based on the source identifier, the UE to perform uplink access.

For example, for step S409 to step S410, refer to step S207 in the embodiment shown in FIG. 2A and FIG. 2B. Details are not described herein again.

In this embodiment of the present disclosure, an interaction procedure implemented in the present disclosure is not limited to simultaneously performing all steps. That is, processing steps of the UE, the first base station, and the second base station may be respectively and independently performed in the UE, the first base station device, and the second base station device. Separate implementation of any device, including the UE, the first base station, and the second base station, falls within the protection scope of this embodiment of the present disclosure.

In this embodiment of the present disclosure, the low consumption state is designed, so that the UE in this state stores the connection context of the UE in the connected state, and performs cell camping based on the cell reselection criterion in the moving process. In addition, the UE in the low consumption state receives the source identifier allocated by the context storage node, and reports the source identifier to the current serving base station of the UE in the moving process when a specific condition is met. Finally, the serving base station sends the source identifier to the context storage node. In this way, both the serving base station and a source base station can learn of location information of the UE. To be specific, after the UE enters the low consumption state, the UE independently performs cell reselection-based mobility management and reports only location change information of the UE. The context storage node stores and traces the location change information of the UE, so that the base station does not strictly control UE movement. This simplifies a handover procedure and saves communication resources of a network device. Further, after the UE enters the low consumption state, both the context storage node and the UE store the connection context of the UE. Therefore, when the UE needs to perform uplink or downlink data communication, a base station can quickly obtain the connection context of the UE from the context storage node, and hand over the UE to the current serving base station of the UE to transmit data. This ensures data transmission efficiency.

To better implement the method embodiments in the embodiments of the present disclosure, the present disclosure further provides a related base station, a related storage node, and related user equipment for cooperating in implementation of the method embodiments. The following provides detailed description with reference to schematic diagrams of the related base station, storage node, and user equipment according to the present disclosure shown in FIG. 5, FIG. 6, FIG. 7, and FIG. 8.

Figure 5:
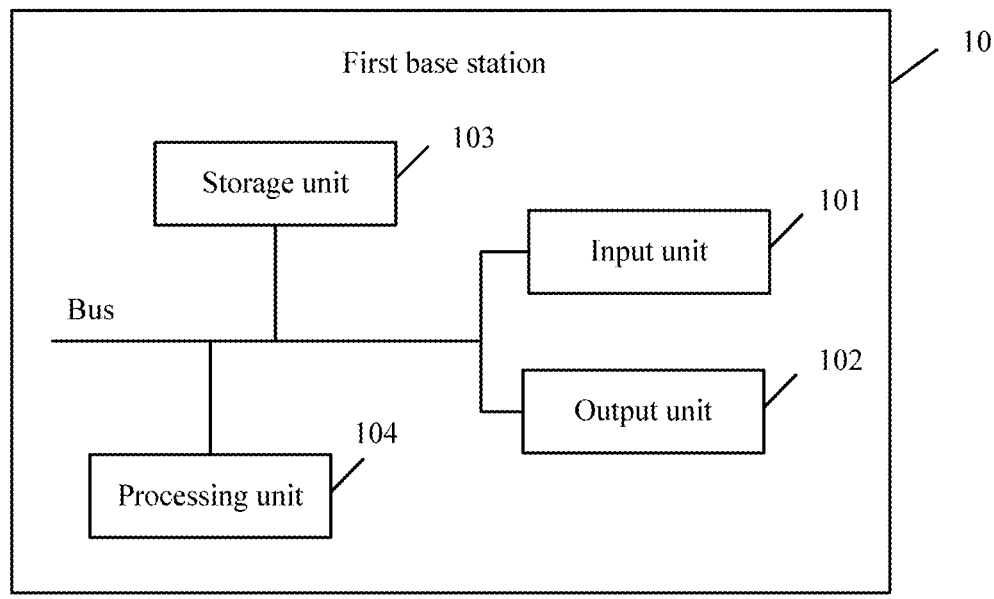
FIG. 5 is a schematic structural diagram of a first base station according to the present disclosure.

FIG. 5 shows a base station 10 according to an embodiment of the present disclosure. The base station 10 is a first base station. The base station includes an output unit 102, a storage unit 103, and a processing unit 104. In some embodiments of the present disclosure, the output unit 102, the storage unit 103, and the processing unit 104 may be connected by using a bus or in another manner. For example, the connection is performed by using the bus in FIG. 5. The processing unit 104 invokes program code in the storage unit 103 to perform the following operations:

determining, by the first base station to which a first cell belongs, a source identifier of user equipment (UE) in a connected state in the first cell, where the source identifier is used to identify the UE; and after determining that the UE enters a low consumption state, storing a connection context of the UE in the connected state, or sending the connection context to a context storage node, where the UE enters the low consumption state when a preset activation condition is met, and in the low consumption state, the UE stores the connection context and performs cell camping based on a cell reselection criterion in a moving process.

In an optional solution, the first base station further includes an input unit 101. That the processing unit 104 is configured to determine a source identifier of user equipment (UE) in a connected state in the first cell is specifically:

receiving, by using the input unit 101, the source identifier of the UE that is sent by the context storage node; or receiving, by using the input unit 101, the source identifier of the UE that is sent by the UE; or receiving, by using the input unit 101, the source identifier of the UE that is sent by a core network device.

In another optional solution, the source identifier includes at least one of an international mobile subscriber identity (IMSI), a temporary identity (T-MISI), and a radio network temporary identifier (RNTI) of the UE.

In still another optional solution, the processing unit 104 is further configured to release the connection context after sending the connection context to the context storage node.

In still another optional solution, the preset activation condition includes at least one or a combination of the following conditions:

the first base station sends the UE a control instruction used to instruct the UE to enter the low consumption state;

no data transmission is performed between the first base station and the UE in first preset duration;

the first base station determines that a timing advance timer (TA timer) of the UE expires, or the first base station determines that the TA timer of the UE expires and the TA timer does not rerun in second preset duration; and the first base station determines that the UE does not exit, after entering a discontinuous reception (DRX) state, the DRX state in third preset duration.

In still another optional solution, the processing unit 104 is further configured to: after determining that the UE enters the low consumption state, send radio resource control (RRC) configuration information to the UE for use by the UE in the low consumption state, where the RRC configuration information includes an RRC configuration index, and the configuration index is used to indicate the RRC configuration information.

It may be understood that, for functions of the units in the first base station 10, refer to specific implementations in the method embodiments in FIG. 2A to FIG. 4B. Details are not described herein again.

Figure 6:
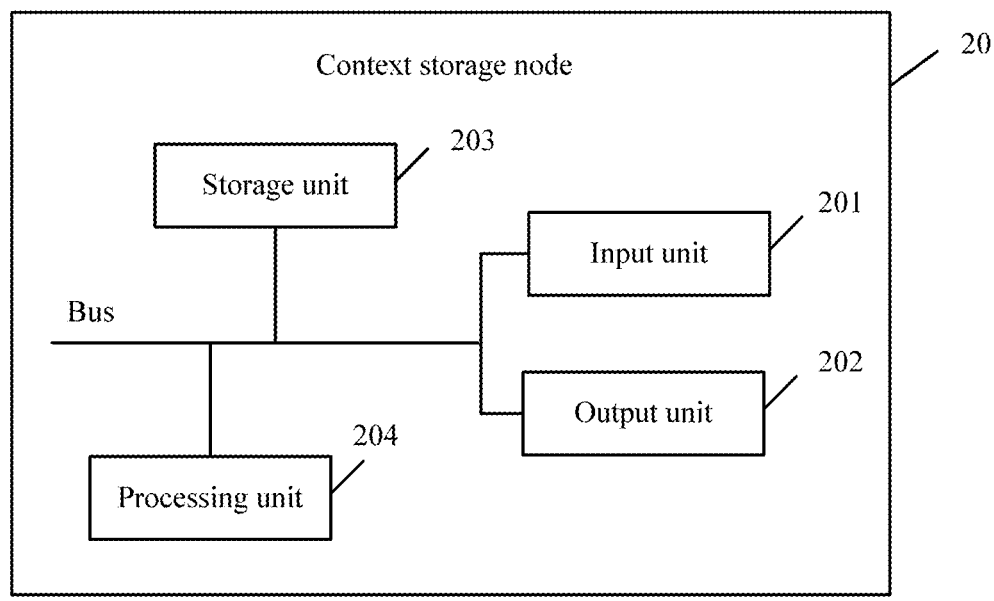
FIG. 6 is a schematic structural diagram of a context storage node according to the present disclosure.

FIG. 6 shows a context storage node 20 according to an embodiment of the present disclosure. The storage node 20 includes an input unit 201, an output unit 202, a storage unit 203, and a processing unit 204. In some embodiments of the present disclosure, the input unit 201, the output unit 202, the storage unit 203, and the processing unit 204 may be connected by using a bus or in another manner. For example, the connection is performed by using the bus in FIG. 6. The processing unit 204 invokes program code in the storage unit 203 to perform the following operations:

receiving, by using the input unit 201, a connection context of user equipment (UE) in a connected state that is sent by a first base station;

determining that the UE is in a low consumption state, and storing the connection context, where in the low consumption state, the UE stores the connection context and performs cell camping based on a cell reselection criterion in a moving process; and sending a path switching request to a core network device by using the output unit 202, so that the core network device switches a core network interface related to the UE to the context storage node.

In an optional solution, the processing unit 204 is further configured to: before receiving, by using the input unit 201, the connection context of the user equipment (UE) in the connected state that is sent by the first base station, allocate a source identifier of the UE, and send the source identifier to the first base station by using the output unit 202.

In another optional solution, the processing unit 204 is further configured to: after determining that the UE is in the low consumption state, receive, by using the input unit 201, a connection context transfer request sent by a second base station, where the connection context is the connection context of the UE in the connected state that is stored by the context storage node when the UE enters the low consumption state, the context transfer request carries the source identifier, and the second base station is a current serving base station of the UE; and send the connection context to the second base station by using the output unit 202 based on the source identifier carried in the transfer request.

In still another optional solution, the processing unit 204 is further configured to: after determining that the UE is in the low consumption state, receive, by using the input unit 201, and store a notification message sent by the second base station, where the notification message carries the source identifier of the UE and a cell identifier of a serving cell in which the UE is currently located, so that the first base station determines the current serving cell of the UE based on the notification message.

In still another optional solution, the notification message carries verification information of the UE, and the verification information is identity verification information generated by the UE based on the source identifier and a key that is stored in the connection context. The processing unit 204 is further configured to determine whether the UE is a valid UE based on the source identifier and the verification information after receiving, by using the input unit 201, and storing the notification message sent by the second base station.

In still another optional solution, the processing unit 204 is further configured to: after determining that the UE is in the low consumption state, send the connection context and the source identifier to the second base station by using the output unit 202 when downlink data of the UE arrives at the context storage node, where the connection context is the connection context of the UE in the connected state that is stored by the context storage node when the UE enters the low consumption state, and the second base station is the current serving base station of the UE.

It may be understood that, for functions of the units in the context storage node 20, refer to specific implementations in the method embodiments in FIG. 2A to FIG. 4B. Details are not described herein again.

Figure 7:
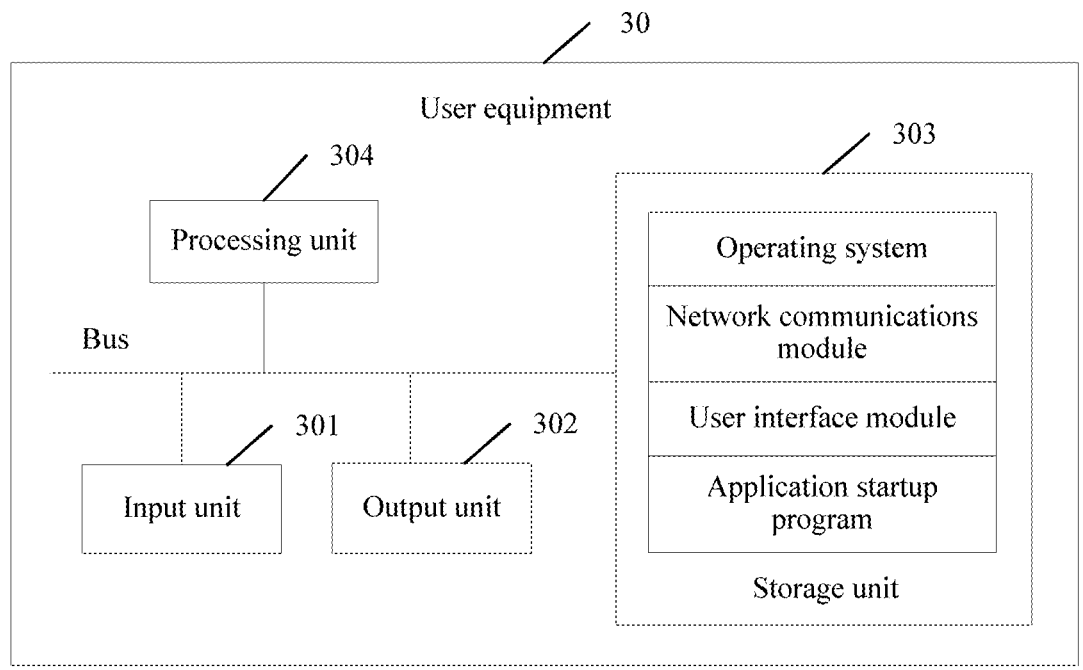
FIG. 7 is a schematic structural diagram of user equipment according to the present disclosure.

FIG. 7 is user equipment 30 according to an embodiment of the present disclosure. The UE 30 may include: an input unit 301, an output unit 302, a storage unit 303, and a processing unit 304. In some embodiments of the present disclosure. A bus is configured to implement communicative connections between these components. The input unit 301 may be specifically a touch control panel of the UE 30, including a touchscreen and a touch control screen and configured to detect an operation instruction on the touch control panel of the UE 30. The output unit 302 may include a display of the UE 30, configured to output and display an image or data. The storage unit 303 may be a high-speed RAM monitor, or may be a non-volatile monitor, for example, at least one disk monitor. Optionally, the storage unit 303 may be at least one display apparatus far away from the processing unit 304. As shown in FIG. 7, as a computer display medium, the storage unit 303 may include an operating system, a network communications module, a user interface module, and a data processing program.

The processing unit 304 of the UE in FIG. 7 invokes program code in the storage unit 303 to perform the following operations:

determining a source identifier of the UE in a connected state in a first cell, where the source identifier is used to identify the UE;

allowing the UE to enter a low consumption state when a preset activation condition is met, where in the low consumption state, the UE stores a connection context of the UE in the connected state and performs cell camping based on a cell reselection criterion in a moving process; and reporting, by using the output unit 302 when a first preset condition is met, the source identifier to a second base station to which a second cell belongs, where the second cell is a serving cell on which the UE currently camps.

In an optional solution, the UE further includes the input unit 301. That the processing unit 304 is configured to determine a source identifier of the UE in a connected state in a first cell is specifically:

determining at least one of an international mobile subscriber identity (IMSI), a temporary identity (T-MISI), and a radio network temporary identifier (RNTI) of the UE as the source identifier; or receiving, by using the input unit 301, the source identifier sent by a first base station, where the first base station is a base station to which the first cell belongs.

In another optional solution, the base station to which the first cell belongs is the first base station; and the preset activation condition includes at least one of the following conditions:

the UE receives a control instruction that is sent by the first base station and that instructs to enter the low consumption state;

the UE leaves the first cell; no data transmission is performed between the UE and the first base station in first preset duration;

a timing advance timer (TA timer) of the UE expires, or the TA timer of the UE expires and the TA timer does not rerun in second preset duration; and after entering a discontinuous reception (DRX) state, the UE does not exit the DRX state in third preset duration.

In still another optional solution, the processing unit 304 is further configured to: after the UE enters the low consumption state when the preset activation condition is met, allow the UE to exit the low consumption state when a second preset condition is met.

The second preset condition includes:

the serving cell on which the UE currently camps changes; or the serving cell on which the UE currently camps goes beyond a specified cell set range; or the serving cell on which the UE currently camps and the first cell do not belong to a same preset area or a same base station; or the UE sends the source identifier to the second base station, and receives an access rejection indication sent by the second base station for the source identifier; or the UE reads a system information broadcast of the second cell, and the system information broadcast carries no indication for allowing the UE in the low consumption state to get access; or the UE needs to send uplink data.

In still another optional solution, that the processing unit 304 is configured to allow the UE to exit the low consumption state when a second preset condition is met is specifically: allowing the UE to clear the connection context and enter an idle state when the second preset condition is met.

In still another optional solution, the first preset condition includes:

the serving cell on which the UE currently camps changes; or the second cell on which the UE currently camps goes beyond a specified cell set range; or the second cell on which the UE currently camps and the first cell do not belong to a same preset area or a same base station; or the UE needs to send uplink data.

In still another optional solution, the UE further includes the input unit 301. The processing unit 304 is further configured to: before reporting, by using the output unit 302 when the first preset condition is met, the source identifier to the second base station to which the second cell belongs, receive, by using the input unit 301, and read a system information broadcast of the second cell; and if the system information broadcast carries an indication for allowing the UE in the low consumption state to get access, determine, based on the access indication, to send the source identifier to the second base station by using the output unit 302.

In still another optional solution, the UE further includes the input unit 301. The processing unit 304 is further configured to: before reporting, by using the output unit 302 when the first preset condition is met, the source identifier to the second base station to which the second cell belongs, send a random access preamble in a preset range to the second base station by using the output unit 302, where the random access preamble in the preset range is used to indicate that the source identifier needs to be sent to the second base station or a message of a length greater than a preset length threshold needs to be sent to the second base station;

receive, by using the input unit 301, a transmission resource of a preset size that is allocated by the second base station and that is used to transmit the source identifier; and use the transmission resource to send the source identifier to the second base station by using the output unit 302.

In still another optional solution, the random access preamble in the preset range is a predefined preamble or a received preamble configured by the second base station.

In still another optional solution, the UE further includes the input unit 301. That the processing unit 304 is configured to use the transmission resource to send the source identifier to the second base station by using the output unit 302 includes:

receiving, by using the input unit 301, an encrypted response message sent by the second base station, and performing decryption based on a key stored in the connection context; and establishing, by the UE, a connection to the second base station based on the response message after the decryption succeeds.

In still another optional solution, the UE further includes the input unit 301. That the processing unit 304 is configured to report the source identifier to a second base station to which a second cell belongs is specifically:

sending a random access preamble to the second base station by using the output unit 302;

receiving, by using the input unit 301, a dedicated UE identifier that is sent by the second base station and a transmission resource that is allocated by the second base station based on the random access preamble and that is used to transmit the source identifier, where the dedicated UE identifier is an identifier used to uniquely identify the UE in the second cell;

using the transmission resource to send the source identifier to the second base station by using the output unit 302;

receiving, by using the input unit 301, confirmation information that is sent by the second base station and that includes the source identifier; and determining, based on the confirmation information, whether to use the dedicated UE identifier.

In still another optional solution, that the processing unit 304 is configured to determine, based on the confirmation information, whether to use the dedicated UE identifier is specifically:

determining, based on the confirmation information, not to use the dedicated UE identifier; or using the dedicated UE identifier based on the confirmation information, and exiting the low consumption state; or using the dedicated UE identifier based on the confirmation information, and remaining in the low consumption state; or using the dedicated UE identifier, and exiting the low consumption state based on an instruction that is carried in the confirmation information and that instructs the UE to exit the low consumption state.

In still another optional solution, the processing unit 304 is further configured to: after using the dedicated UE identifier, update a key in the connection context based on a cell identifier of the serving cell on which the UE currently camps.

In still another optional solution, the source identifier further includes verification information, where the verification information is identity verification information generated by the UE based on the source identifier and the updated key.

In still another optional solution, the processing unit 304 is further configured to monitor paging based on the source identifier after the UE enters the low consumption state when the preset activation condition is met.

In still another optional solution, the UE further includes the input unit 301. The processing unit 304 is further configured to: after the UE enters the low consumption state when the preset activation condition is met, receive, by using the input unit 301, radio resource control (RRC) configuration information sent by the first base station, where the RRC configuration information includes an RRC configuration index, and the configuration index is used to indicate the RRC configuration information; and allow the UE in the low consumption state to use the RRC configuration information.

In still another optional solution, that the processing unit 304 is configured to report, by using the output unit 302 when a first preset condition is met, the source identifier to a second base station to which a second cell belongs is specifically:

reporting, by using the output unit 302, the source identifier including the RRC configuration index to the second base station to which the second cell belongs, so that the second base station determines, based on the RRC configuration index, the RRC configuration information used by the UE.

In still another optional solution, the first preset condition is that the UE needs to send uplink data, and the processing unit 304 is further configured to: report, by using the output unit 302, the source identifier to the second base station to which the second cell belongs, and when or after reporting the source identifier, report an uplink data indication to the second base station to which the second cell belongs.

It may be understood that, for functions of the units in the user equipment 30, refer to specific implementations in the method embodiments in FIG. 2A to FIG. 4B. Details are not described herein again.

Figure 8:
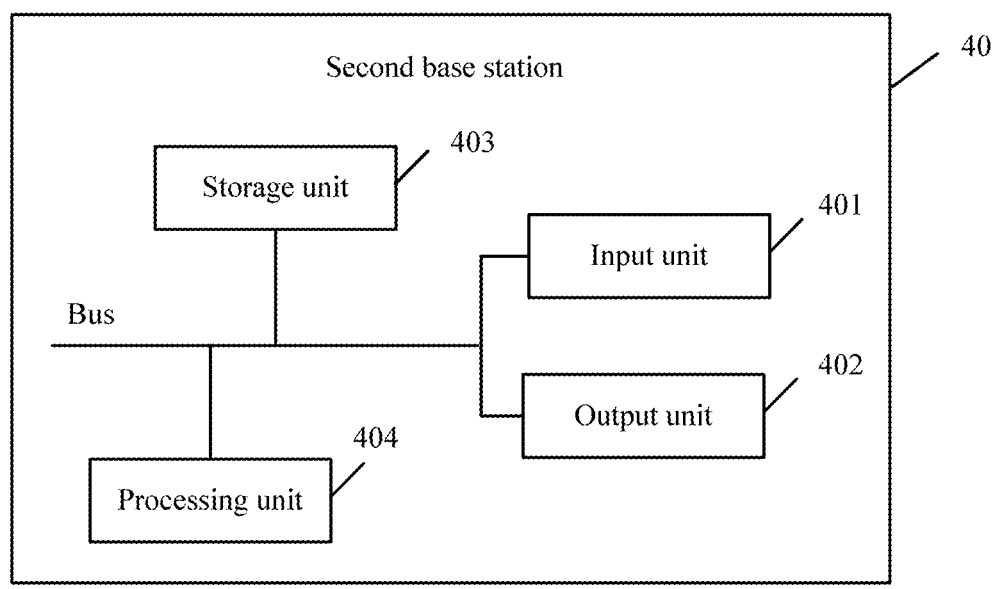
FIG. 8 is a schematic structural diagram of a second base station according to the present disclosure.

FIG. 8 shows a base station 40 according to an embodiment of the present disclosure. The base station 40 is a second base station. The base station 40 includes an input unit 401, an output unit 402, a storage unit 403, and a processing unit 404. In some embodiments of the present disclosure, the input unit 401, the output unit 402, the storage unit 403, and the processing unit 404 may be connected by using a bus or in another manner. For example, the connection is performed by using the bus in FIG. 8. The processing unit 404 invokes program code in the storage unit 403 to perform the following operations:

receiving, by using the input unit 401, a source identifier reported by user equipment (UE) in a low consumption state, where in the low consumption state, the UE stores a connection context of the UE in a connected state and performs cell camping based on a cell reselection criterion in a moving process, the first cell is a serving cell of the UE when the UE enters the low consumption state, a second cell is a current serving cell of the UE, and the source identifier includes a first UE identifier used to identify the UE in a first base station to which the first cell belongs; and sending the first UE identifier to a context storage node by using the output unit 402 based on the source identifier, to notify the context storage node that it is learned that the current serving cell of the UE is the second cell.

In another optional solution, the source identifier includes at least one of an international mobile subscriber identity (IMSI), a temporary identity (T-MISI), and a radio network temporary identifier (RNTI) of the UE.

In still another optional implementation, the source identifier further includes indication information. The indication information is used to notify the second base station that the UE is in the low consumption state.

In still another optional solution, the processing unit 404 is further configured to: send a system information broadcast by using the output unit 402 before receiving, by using the input unit 401, the source identifier reported by the user equipment (UE) in the low consumption state. The system information broadcast carries an indication for allowing the UE in the low consumption state to get access, so that the UE determines, based on the access indication, whether to send the source identifier to the second base station.

In still another optional solution, the processing unit 404 is further configured to: before receiving, by using the input unit 401, the source identifier reported by the user equipment (UE) in the low consumption state, receive, by using the input unit 401, a random access preamble sent by the UE; and allocate a transmission resource of a preset size to the UE when the random access preamble falls within a preset range, so that the UE uses the transmission resource to send the source identifier.

In still another optional solution, the random access preamble in the preset range is a predefined preamble or a received preamble configured by the second base station.

In still another optional solution, that the processing unit 404 is configured to receive, by using the input unit 401, a source identifier reported by user equipment (UE) in a low consumption state is specifically:

receiving, by using the input unit 401, a random access preamble sent by the user equipment (UE) in the low consumption state;

allocating, to the UE by using the output unit 402 based on the random access preamble, a dedicated UE identifier and a transmission resource that is used to transmit the source identifier, where the dedicated UE identifier is an identifier used to uniquely identify the UE in the second cell;

using the transmission resource to receive the source identifier by using the input unit 401; and sending confirmation information including the source identifier to the UE by using the output unit 402.

In still another optional solution, the processing unit 404 is further configured to: after receiving, by using the input unit 401, the random access preamble sent by the user equipment (UE) in the low consumption state, generate a response message corresponding to the reported source identifier, where the response message is encrypted based on a key stored in the connection context; and send the encrypted response message to the UE by using the output unit 402.

In still another optional solution, that the processing unit 404 is configured to send, by using the output unit 402, confirmation information including the source identifier to the UE by using the output unit 402 is specifically:

sending a confirmation message that includes the source identifier and that carries an instruction instructing the UE to exit the low consumption state to the UE by using the output unit 402, so that the UE uses the dedicated UE identifier and exits the low consumption state based on the instruction.

In still another optional solution, that the processing unit 404 is configured to send the first UE identifier to the context storage node by using the output unit 402 based on the source identifier is specifically:

sending a notification message to the context storage node by using the output unit 402 based on the source identifier, where the notification message carries the source identifier of the UE and a second cell identifier of the second cell in which the UE is currently located, so that the context storage node determines, based on the source identifier and the second cell identifier, that a serving cell on which the UE currently camps is the second cell.

In still another optional solution, the processing unit 404 is further configured to: after sending the first UE identifier to the context storage node based on the source identifier, receive, by using the input unit 401, the source identifier and an uplink data indication that are sent by the UE;

send a connection context transfer request to the context storage node by using the output unit 402, where the connection context is the connection context of the UE in the connected state that is stored by the context storage node when the UE enters the low consumption state, and the context transfer request carries the source identifier of the UE; and receive, by using the input unit 401, the connection context transferred by the context storage node, and establish a connection to the UE based on the connection context.

In still another optional solution, the processing unit 404 is further configured to: after receiving, by using the input unit 401, the connection context transferred by the context storage node, send a reallocated source identifier to the UE by using the output unit 402, where the reallocated source identifier includes a second UE identifier used to identify the UE in the second base station; and send, by using the output unit 402, an instruction to the UE to instruct the UE to exit the low consumption state.

In still another optional solution, the processing unit 404 is further configured to: after sending the first UE identifier to the context storage node by using the output unit 402 based on the source identifier, receive, by using the input unit 401, the connection context and the source identifier of the UE that are sent by the context storage node; and determine configuration information of the UE based on the received connection context and source identifier, and trigger, based on the source identifier, the UE to perform uplink access.

In still another optional solution, that the processing unit 404 is configured to trigger, based on the source identifier, the UE perform uplink access is specifically:

paging the UE based on the source identifier; or determining the dedicated UE identifier of the UE based on the source identifier, and sending an uplink access command to the UE based on the dedicated UE identifier; or determining the dedicated UE identifier of the UE based on the source identifier, and paging the UE based on the dedicated UE identifier.

In still another optional solution, the source identifier further includes a radio resource control (RRC) configuration index. The processing unit 404 is further configured to: after receiving, by using the input unit 401, the source identifier reported by the user equipment (UE) in the low consumption state, determine, based on the RRC configuration index, RRC configuration information used by the UE.

In still another optional solution, that the processing unit 404 is configured to send the first UE identifier to the context storage node based on the source identifier is specifically:

sending the source identifier to the context storage node through an interface between the output unit 402 and the context storage node based on the source identifier; or sending the source identifier to the context storage node by using the output unit 402 and a core network.

It may be understood that, for functions of the units in the second base station 40, refer to specific implementations in the method embodiments in FIG. 2A to FIG. 4B. Details are not described herein again.

It should be noted that the foregoing method embodiments of the present disclosure may be applied to a processor, or be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processing, DSP), an application-specific integrated circuit (Application Specific Integrated Circuit, ASIC), a field programmable gate array (Field Programmable Gate Array, FPGA), another programmable logic device, a discrete gate, a transistor logic device, or a discrete hardware component. All methods, steps, and logical diagrams disclosed in the embodiments of the present disclosure may be implemented or performed. The general purpose processor may be a microprocessor, or the processor may be any normal processor, or the like. The steps of the methods disclosed in the embodiments of the present disclosure may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor.

It may be understood that the memory in the embodiments of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. According to description that is used as an example instead of a limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and the method that are described in this specification intends to include but is not limited to these types and any other proper type of memories.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A base station, wherein the base station is a first base station, and the first base station comprises: an output unit, a memory, and a processor;
   the memory is configured to store program code, and the processor is configured to invoke the program code stored in the memory to perform the following steps:
   determining a source identifier of a user equipment (UE) in a connected state in a first cell, wherein the source identifier is used to identify the UE; and
   after determining that the UE enters a low consumption state, storing a connection context of the UE in the connected state, or sending the connection context to a context storage node using the output unit, wherein the UE enters the low consumption state when a preset activation condition is met, and in the low consumption state, the UE stores the connection context and performs cell camping based on a cell reselection criterion in a moving process,
   wherein the preset activation condition comprises at least one or a combination of the following conditions:
   the first base station sends the UE a control instruction used to instruct the UE to enter the low consumption state;
   no data transmission is performed between the first base station and the UE in a first preset duration;
   the first base station determines that a timing advance timer (TA timer) of the UE expires, or the first base station determines that the TA timer of the UE expires and the TA timer does not rerun in a second preset duration; and
   the first base station determines that the UE does not exit, after entering a discontinuous reception (DRX) state, the DRX state being in a third preset duration.

2. The base station according to claim 1, wherein the first base station further comprises an input unit, and that the processor is configured to determine a source identifier of a user equipment (UE) in a connected state in the first cell includes:
   receiving, by the input unit, the source identifier of the UE that is sent by the context storage node; or receiving, by the input unit, the source identifier of the UE that is sent by the UE; or receiving, by the input unit, the source identifier of the UE that is sent by a core network device.

3. The base station according to claim 1, wherein the source identifier comprises at least one of an international mobile subscriber identity (IMSI), a temporary identity (T-MISI), and a radio network temporary identifier (RNTI) of the UE.

4. The base station according to claim 1, wherein the processor is further configured to release the connection context after sending the connection context to the context storage node.

5. A context storage node, wherein the context storage node comprises: an input unit, an output unit, a memory, and a processor;
   the memory is configured to store program code, and the processor is configured to invoke the program code stored by the memory to perform the following steps:
   receiving, by the input unit, a connection context of user equipment (UE) in a connected state that is sent by a first base station;
   determining that the UE is in a low consumption state, and storing the connection context, wherein in the low consumption state, the UE stores the connection context and performs cell camping based on a cell reselection criterion in a moving process; and
   sending a path switching request to a core network device, by the output unit, so that the core network device switches a core network interface related to the UE to the context storage node,
   wherein the preset activation condition comprises at least one or a combination of the following conditions:
   the first base station sends the UE a control instruction used to instruct the UE to enter the low consumption state;
   no data transmission is performed between the first base station and the UE in a first preset duration;
   the first base station determines that a timing advance timer (TA timer) of the UE expires, or the first base station determines that the TA timer of the UE expires and the TA timer does not rerun in a second preset duration; and
   the first base station determines that the UE does not exit, after entering a discontinuous reception (DRX) state, the DRX state being in a third preset duration.

6. The storage node according to claim 5, wherein the processor is further configured to: before receiving, by the input unit, the connection context of the user equipment (UE) in the connected state that is sent by the first base station, allocate a source identifier of the UE, and send the source identifier to the first base station by using the output unit.

7. The storage node according to claim 5, wherein the processor is further configured to: after determining that the UE is in the low consumption state, receive, by the input unit, a connection context transfer request sent by a second base station, wherein the connection context is the connection context of the UE in the connected state that is stored by the context storage node when the UE enters the low consumption state, the context transfer request carries the source identifier, and the second base station is a current serving base station of the UE; and
   send the connection context to the second base station by using the output unit based on the source identifier carried in the transfer request.

8. The storage node according to claim 5, wherein the processor is further configured to: after determining that the UE is in the low consumption state, receive, by the input unit, and store a notification message sent by the second base station, wherein the notification message carries the source identifier of the UE and a cell identifier of a serving cell in which the UE is currently located, to enable the first base station to determine the current serving cell of the UE based on the notification message.

9. The storage node according to claim 8, wherein the notification message carries verification information of the UE, and the verification information is identity verification information generated by the UE based on the source identifier and a key that is stored in the connection context; and the processor is further configured to determine whether the UE is a valid UE based on the source identifier and the verification information after receiving, by the input unit, and storing the notification message sent by the second base station.

10. A user equipment (UE), wherein the UE comprises: an output unit, a memory, and a processor;
the memory is configured to store program code, and the processor is configured to invoke the program code stored by the memory to perform the following steps:
determining a source identifier of the UE in a connected state in a first cell, wherein the source identifier is used to identify the UE;
allowing the UE to enter a low consumption state when a preset activation condition is met, wherein in the low consumption state, the UE stores a connection context of the UE in the connected state and performs cell camping based on a cell reselection criterion in a moving process; and
reporting, by the output unit when a first preset condition is met, the source identifier to a second base station to which a second cell belongs, wherein the second cell is a serving cell on which the UE currently camps,
wherein the base station to which the first cell belongs is the first base station; and the preset activation condition comprises at least one of the following conditions:
the UE receives a control instruction that is sent by the first base station and that instructs to enter the low consumption state;
the UE leaves the first cell;
no data transmission is performed between the UE and the first base station in a first preset duration;
a timing advance timer (TA timer) of the UE expires, or the TA timer of the UE expires and the TA timer does not rerun in a second preset duration; and
after entering a discontinuous reception (DRX) state, the UE does not exit the DRX state in a third preset duration.

11. The UE according to claim 10, wherein the UE further comprises an input unit, and that the processor is configured to determine a source identifier of the UE in a connected state in a first cell includes:
determining at least one of an international mobile subscriber identity (IMSI), a temporary identity (T-MISI), and a radio network temporary identifier (RNTI) of the UE as the source identifier; or receiving, by the input unit, the source identifier sent by a first base station, wherein the first base station is a base station to which the first cell belongs.

12. The UE according to claim 10, wherein the processor is further configured to: after the UE enters the low consumption state when the preset activation condition is met, allow the UE to exit the low consumption state when a second preset condition is met; and
the second preset condition comprises:
the serving cell on which the UE currently camps changes; or the serving cell on which the UE currently camps goes beyond a specified cell set range; or the serving cell on which the UE currently camps and the first cell do not belong to a same preset area or a same base station; or the UE sends the source identifier to the second base station, and receives an access rejection indication sent by the second base station for the source identifier; or the UE reads a system information broadcast of the second cell, and the system information broadcast carries no indication for allowing the UE in the low consumption state to get access; or the UE needs to send uplink data.

13. The UE according to claim 12, wherein that the processor is configured to allow the UE to exit the low consumption state when a second preset condition is met includes allowing the UE to clear the connection context and enter an idle state when the second preset condition is met.

14. The UE according to claim 10, wherein the first preset condition comprises:
the serving cell on which the UE currently camps changes; or the second cell on which the UE currently camps goes beyond a specified cell set range; or the second cell on which the UE currently camps and the first cell do not belong to a same preset area or a same base station; or the UE needs to send uplink data.

15. The UE according to claim 10, wherein the processor is further configured to: before reporting, by the output unit, when the first preset condition is met, the source identifier to the second base station to which the second cell belongs,
receive, by the input unit, and read a system information broadcast of the second cell; and
if the system information broadcast carries an indication for allowing the UE in the low consumption state to get access, determine, based on the access indication, to send the source identifier to the second base station using the output unit.

16. The UE according to claim 10, wherein the processor is further configured to: before reporting, by the output unit, when the first preset condition is met, the source identifier to the second base station to which the second cell belongs,
send a random access preamble in a preset range to the second base station, by the output unit, wherein the random access preamble in the preset range is used to indicate that the source identifier needs to be sent to the second base station or a message of a length greater than a preset length threshold needs to be sent to the second base station;
receive, by the input unit, a transmission resource of a preset size that is allocated by the second base station and that is used to transmit the source identifier; and
use the transmission resource to send the source identifier to the second base station by using the output unit.

17. The UE according to claim 16, wherein the random access preamble in the preset range is a predefined preamble or a received preamble configured by the second base station.

18. The UE according to claim 10, wherein the processor is further configured to: after the UE enters the low consumption state when the preset activation condition is met, receive, by the input unit, radio resource control (RRC) configuration information sent by the first base station, wherein the RRC configuration information comprises an RRC configuration index, and the configuration index is used to indicate the RRC configuration information; and
allow the UE in the low consumption state to use the RRC configuration information.

* * * * *

UNITED STATES PATENT AND TRADEMARK OFFICE
CERTIFICATE OF CORRECTION

PATENT NO. : 10,708,971 B2
APPLICATION NO. : 16/023617
DATED : July 7, 2020
INVENTOR(S) : Li et al.

Page 1 of 1

It is certified that error appears in the above-identified patent and that said Letters Patent is hereby corrected as shown below:

Other Publications, Citation 1: "3GPP TR 23/20" should read -- 3GPP 23.720 --.

Other Publications, Citation 2: "overall lescription" should read -- overall description --.

Signed and Sealed this
Twelfth Day of January, 2021

Andrei Iancu
*Director of the United States Patent and Trademark Office*